US012597725B2

(12) United States Patent
Yao et al.

(10) Patent No.: US 12,597,725 B2
(45) Date of Patent: Apr. 7, 2026

(54) CONNECTOR MODULE WITH IMPROVED HEAT DISSIPATION PERFORMANCE

(71) Applicant: DONGGUAN LUXSHARE TECHNOLOGIES CO., LTD, Dongguan City (CN)

(72) Inventors: Kunlin Yao, Dongguan City (CN); Rongzhe Guo, Dongguan City (CN); Chenhui Zeng, Dongguan City (CN); Ruoyi Zhang, Dongguan City (CN); Henning Hansen, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 244 days.

(21) Appl. No.: 18/225,489

(22) Filed: Jul. 24, 2023

(65) Prior Publication Data

US 2024/0195100 A1 Jun. 13, 2024

(30) Foreign Application Priority Data

Dec. 13, 2022 (CN) ......................... 202211593083.0

(51) Int. Cl.
*H01R 12/75* (2011.01)
*H01R 12/51* (2011.01)
(Continued)

(52) U.S. Cl.
CPC ........... *H01R 12/75* (2013.01); *H01R 12/515* (2013.01); *H01R 12/585* (2013.01);
(Continued)

(58) Field of Classification Search
CPC .... H01R 13/518; H01R 12/515; H01R 12/75; H05K 7/1084
(Continued)

(56) References Cited

U.S. PATENT DOCUMENTS 5,205,741 A 4/1993 Steen et al.
5,530,291 A 6/1996 Chan et al.
(Continued)

FOREIGN PATENT DOCUMENTS

CN 210779161 U 6/2020
CN 111555068 A 8/2020
(Continued)

OTHER PUBLICATIONS

U.S. Office Action for U.S. Appl. No. 18/225,230, dated Oct. 14, 2025.

*Primary Examiner* — Hae Moon Hyeon
(74) *Attorney, Agent, or Firm* — Birch, Stewart, Kolasch & Birch, LLP

(57) ABSTRACT

A connector module includes a bracket and at least one cable connector. The bracket includes a first bracket and a second bracket. The first bracket defines at least one receiving groove. The first bracket includes an opening surrounded by a number of side walls. The second bracket is of a frame-shaped configuration, and includes a central opening extending therethrough along a vertical direction. The cable connector includes a body, a number of conductive terminals and a cable. The body is at least partially received in the receiving groove. The conductive terminals are configured to engage with the conductive elements of a circuit board. The circuit board is at least partially clamped between the first bracket and the second bracket. The circuit board is configured to mount a chip which is exposed in the opening.

19 Claims, 26 Drawing Sheets

(51) Int. Cl.

| | |
|---|---|
| ***H01R 12/58*** | (2011.01) |
| ***H01R 13/504*** | (2006.01) |
| ***H01R 13/512*** | (2006.01) |
| ***H01R 13/518*** | (2006.01) |
| ***H01R 13/6471*** | (2011.01) |
| ***H01R 13/6581*** | (2011.01) |
| ***H01R 13/6585*** | (2011.01) |
| ***H01R 13/6594*** | (2011.01) |

(52) U.S. Cl.
CPC ....... *H01R 13/5045* (2013.01); *H01R 13/512* (2013.01); *H01R 13/518* (2013.01); *H01R 13/6471* (2013.01); *H01R 13/6581* (2013.01); *H01R 13/6585* (2013.01); *H01R 13/6594* (2013.01)

(58) Field of Classification Search
USPC ...................................... 439/485, 540, 540.1
See application file for complete search history.

(56) References Cited

U.S. PATENT DOCUMENTS

| | | | | |
|---|---|---|---|---|
| 5,571,021 | A | 11/1996 | Kawabe et al. | |
| 6,497,582 | B1 | 12/2002 | Hoffmeyer | |
| 6,971,887 | B1 | 12/2005 | Trobough | |
| 7,248,481 | B2 | 7/2007 | Trobough | |
| 7,278,859 | B1 | 10/2007 | Irvine et al. | |
| 7,500,869 | B2 | 3/2009 | Wang | |
| 7,517,228 | B2 | 4/2009 | Baskaran et al. | |
| 7,614,897 | B2 | 11/2009 | Lopez | |
| 8,708,729 | B2 | 4/2014 | An et al. | |
| 10,069,244 | B2 | 9/2018 | Neu et al. | |
| 10,218,098 | B1 | 2/2019 | Lian et al. | |
| 11,081,821 | B2 | 8/2021 | Blackburn et al. | |
| 11,362,448 | B2 | 6/2022 | Sherman et al. | |
| 11,443,998 | B2 | 9/2022 | Blackburn et al. | |
| 11,477,904 | B2 | 10/2022 | Blackburn et al. | |
| 11,503,732 | B1 * | 11/2022 | Costello ................. | H01R 13/05 |
| 11,943,886 | B2 * | 3/2024 | Blackburn ............. | H01R 13/24 |
| 2004/0218372 | A1 | 11/2004 | Hamasaki et al. | |
| 2011/0287639 | A1 | 11/2011 | Hsu | |
| 2013/0224970 | A1 | 8/2013 | Sandhu et al. | |
| 2014/0302713 | A1 | 10/2014 | Su et al. | |
| 2015/0079815 | A1 | 3/2015 | Leigh et al. | |
| 2015/0325941 | A1 | 11/2015 | Chen et al. | |
| 2020/0366017 | A1 | 11/2020 | Blackburn et al. | |
| 2021/0194183 | A1 * | 6/2021 | Guo ..................... | H01R 13/516 |
| 2021/0274673 | A1 * | 9/2021 | Blackburn .......... | H01L 23/4093 |
| 2021/0359472 | A1 | 11/2021 | Zhu et al. | |
| 2021/0399480 | A1 | 12/2021 | Song et al. | |
| 2022/0115816 | A1 | 4/2022 | Huang et al. | |
| 2022/0151095 | A1 * | 5/2022 | Blackburn ........... | H05K 7/1061 |
| 2022/0354013 | A1 * | 11/2022 | Costello ............... | H05K 7/1092 |
| 2022/0407263 | A1 | 12/2022 | Guo et al. | |
| 2023/0032114 | A1 | 2/2023 | Kubota | |
| 2024/0047910 | A1 | 2/2024 | Morgan et al. | |
| 2024/0195100 | A1 | 6/2024 | Yao et al. | |
| 2024/0195126 | A1 | 6/2024 | Yao et al. | |
| 2024/0356256 | A1 | 10/2024 | Yao et al. | |

FOREIGN PATENT DOCUMENTS

| | | | | | |
|---|---|---|---|---|---|
| CN | 111882366 | A | | 9/2020 | |
| CN | 112350095 | A | | 2/2021 | |
| CN | 112753137 | A | | 5/2021 | |
| CN | 113346270 | A | | 9/2021 | |
| CN | 214378871 | U | * | 10/2021 | |
| CN | 113612084 | A | | 11/2021 | |
| CN | 114389073 | A | | 4/2022 | |
| CN | 114552248 | A | * | 5/2022 | ........... H05K 7/1092 |
| CN | 115315855 | A | | 11/2022 | |
| CN | 220672929 | U | | 3/2024 | |
| TW | 202114301 | A | | 4/2021 | |
| TW | 202131555 | A | | 8/2021 | |
| TW | 202141868 | A | | 11/2021 | |
| TW | 202147717 | A | | 12/2021 | |
| TW | 202203516 | A | | 1/2022 | |
| TW | I766556 | B | | 6/2022 | |
| TW | 202240982 | A | | 10/2022 | |
| TW | 202247549 | A | | 12/2022 | |
| WO | WO 2015/186953 | A1 | | 12/2015 | |

* cited by examiner

CONNECTOR MODULE WITH IMPROVED HEAT DISSIPATION PERFORMANCE

CROSS-REFERENCE TO RELATED APPLICATION

This patent application claims priority of a Chinese Patent Application No. 202211593083.0, filed on Dec. 13, 2022 and titled "CONNECTOR MODULE AND ASSEMBLY METHOD THEREOF", the entire content of which is incorporated herein by reference.

TECHNICAL FIELD

The present disclosure relates to a connector module, which belongs to a technical field of wire-to-board interconnection.

BACKGROUND

In order to realize interconnection between a cable and a circuit board, there are usually two technical solutions in the related art. A first solution is to realize the interconnection through a male connector and a female connector which are mated with each other. One of the male connector and the female connector is connected to the cable, and a remaining one is connected to the circuit board. However, under this interconnection architecture, the volume occupied is relatively large, and it is difficult to meet the requirement of miniaturization. A second solution is to have only one connector which is connected to the cable. The connector is provided with elastic abutting arms. The elastic abutting arms are configured to directly contact metal conductive pads on the circuit board. However, with the terminal density becomes higher and higher, how to achieve a design balance between making the elastic abutting arm have a sufficient length to ensure its elasticity and how to reduce the occupied space of the elastic abutting arm is a technical problem faced by those skilled in the art.

In addition, how to fix the circuit board and maintain good heat dissipation is a technical problem faced by those skilled in the art.

SUMMARY

An object of the present disclosure is to provide a connector module with improved heat dissipation performance.

In order to achieve the above object, the present disclosure adopts the following technical solution: a connector module, including: a bracket including a first bracket and a second bracket, the first bracket defining at least one receiving groove; the first bracket including an opening surrounded by a plurality of side walls; the second bracket being of a frame-shaped configuration, and the second bracket includes a central opening extending through the second bracket along a vertical direction; and at least one cable connector, the cable connector including a body, a plurality of conductive terminals and a plurality of cables connected to the plurality of conductive terminals, the body being at least partially accommodated in the receiving groove, the plurality of conductive terminals being configured to engage with a plurality of conductive elements of a circuit board; the circuit board being at least partially clamped between the first bracket and the second bracket; the circuit board being configured to mount a chip which is exposed in the opening.

In order to achieve the above object, the present disclosure adopts the following technical solution: a connector module, including; a bracket including a first bracket and a second bracket; the first bracket including a plurality of side walls and an opening surrounded by the plurality of side walls; the plurality of side walls including a first side wall, a second side wall opposite to the first side wall, a third side wall connecting one end of the first side wall and one end of the second side wall, and a fourth side wall connecting another end of the first side wall and another end of the second side wall; each of the first side wall, the second side wall, the third side wall and the fourth side wall being provided with a plurality of receiving grooves; the second bracket being of a frame-shaped configuration, and the second bracket including a central opening extending through the second bracket along a vertical direction and a plurality of heat dissipation channels extending along horizontal directions; and a plurality of cable connectors correspondingly accommodated in the receiving grooves; each cable connector including a body, a plurality of conductive terminals and a plurality of cables connected to the plurality of conductive terminals, each body being at least partially accommodated in a corresponding receiving groove, the plurality of conductive terminals being configured to engage with a plurality of conductive elements of a circuit board; the circuit board being at least partially clamped between the first bracket and the second bracket; the circuit board being configured to mount a chip which is exposed in the opening; the central opening corresponds to the chip along the vertical direction.

Compared with the prior art, the present disclosure has the bracket, and the bracket includes the first bracket and the second bracket. The circuit board is configured to be at least partially clamped between the first bracket and the second bracket, so that the circuit board can be better fixed. Besides, by providing the opening and the central opening, and configuring the chip to be exposed in the opening, the heat dissipation performance of the present disclosure is improved.

DETAILED DESCRIPTION

Figure 1:
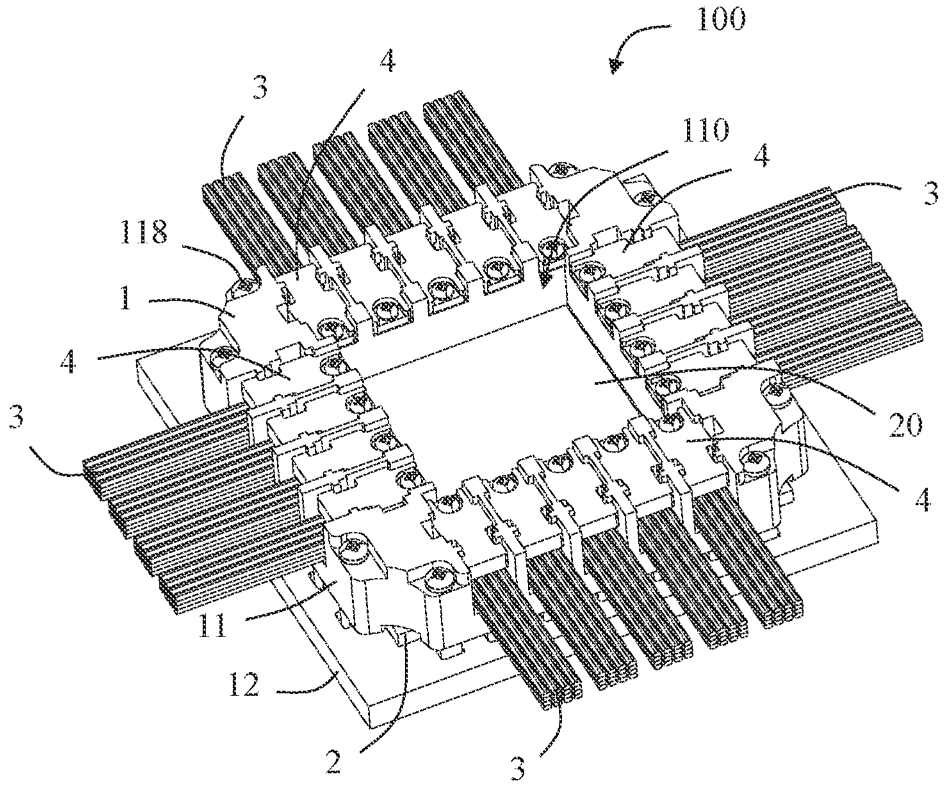
FIG. 1 is a schematic perspective view of a connector module in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 8, the present disclosure discloses a connector module 100 which includes a bracket 1, a circuit board 2, a plurality of cable connectors 3 and a plurality of pressing blocks 4. In the illustrated embodiment of the present disclosure, the circuit board 2 is fixed on the bracket 1. The bracket 1 includes a first bracket 11 and a second bracket 12. The circuit board 2 is at least partially clamped between the first bracket 11 and the second bracket 12.

Figure 12:
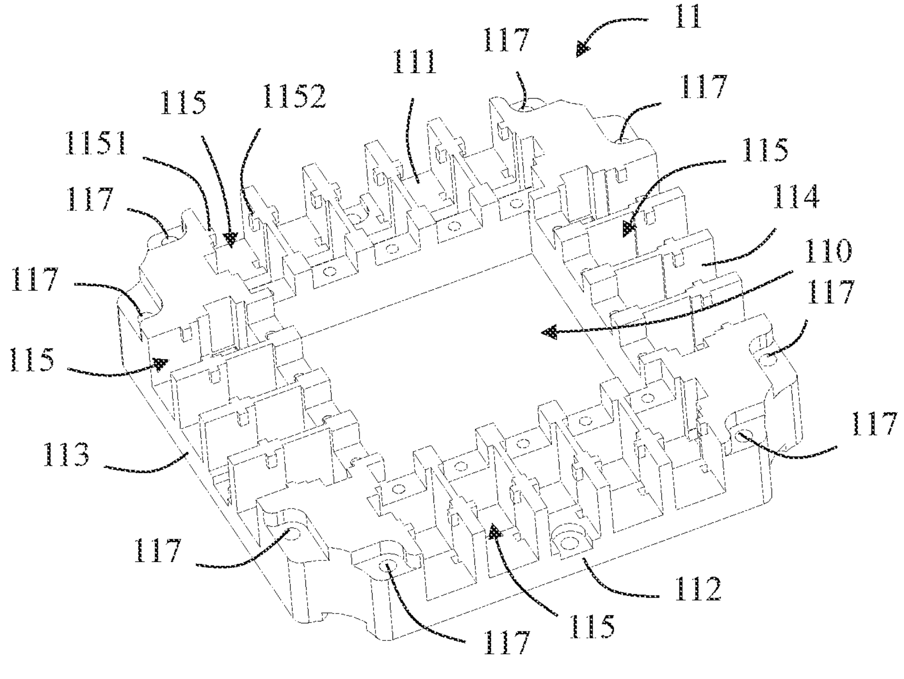
FIG. 12 is a schematic perspective view of a first bracket of the connector module of the present disclosure.
Figure 13:
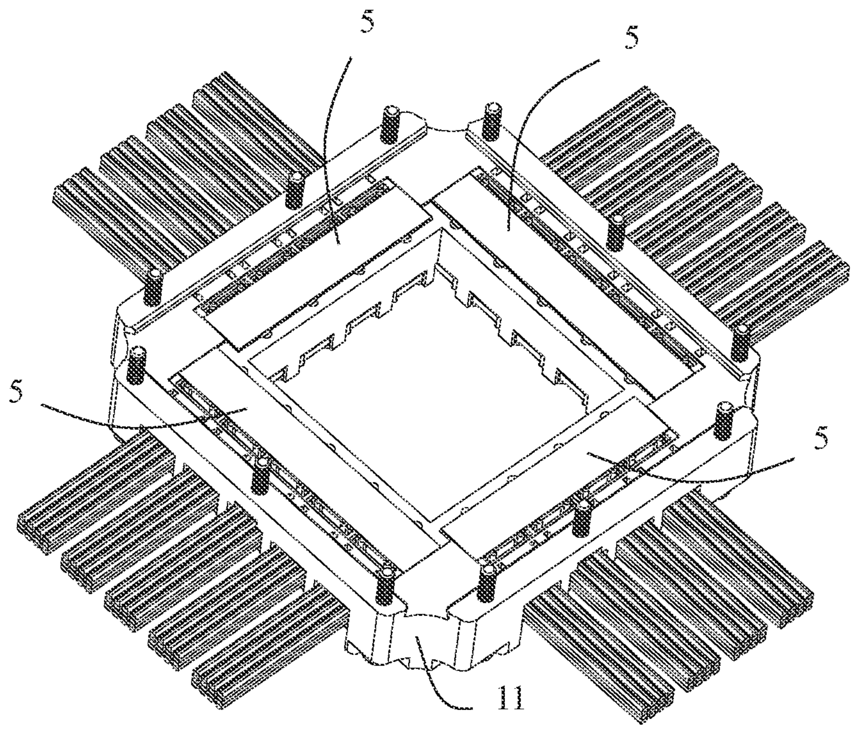
FIG. 13 is a schematic perspective view of FIG. 2 after removing the second bracket and the circuit board.

Referring to FIG. 12, the first bracket 11 includes a plurality of side walls and an opening 110 at least partially surrounded by the plurality of side walls. In the illustrated embodiment of the present disclosure, the first bracket 11 is substantially in a shape of a frame. The plurality of side walls include a first side wall 111, a second side wall 112 opposite to the first side wall 111, a third side wall 113 connecting one end of the first side wall 111 and one end of the second side wall 112, and a fourth side wall 114 connecting the other end of the first side wall 111 and the other end of the second side wall 112. The opening 110 is surrounded by the first sidewall 111, the second sidewall 112, the third sidewall 113 and the fourth sidewall 114. The opening 110 is opened upwardly.

In the illustrated embodiment of the present disclosure, the first sidewall 111, the second sidewall 112, the third sidewall 113 and the fourth sidewall 114 are all provided with a plurality of receiving grooves 115. The structures of the plurality of receiving grooves 115 are the same, and the following only takes one receiving groove 115 on one side wall (e.g., the first side wall 111) as an example for description in detail.

Figure 9:
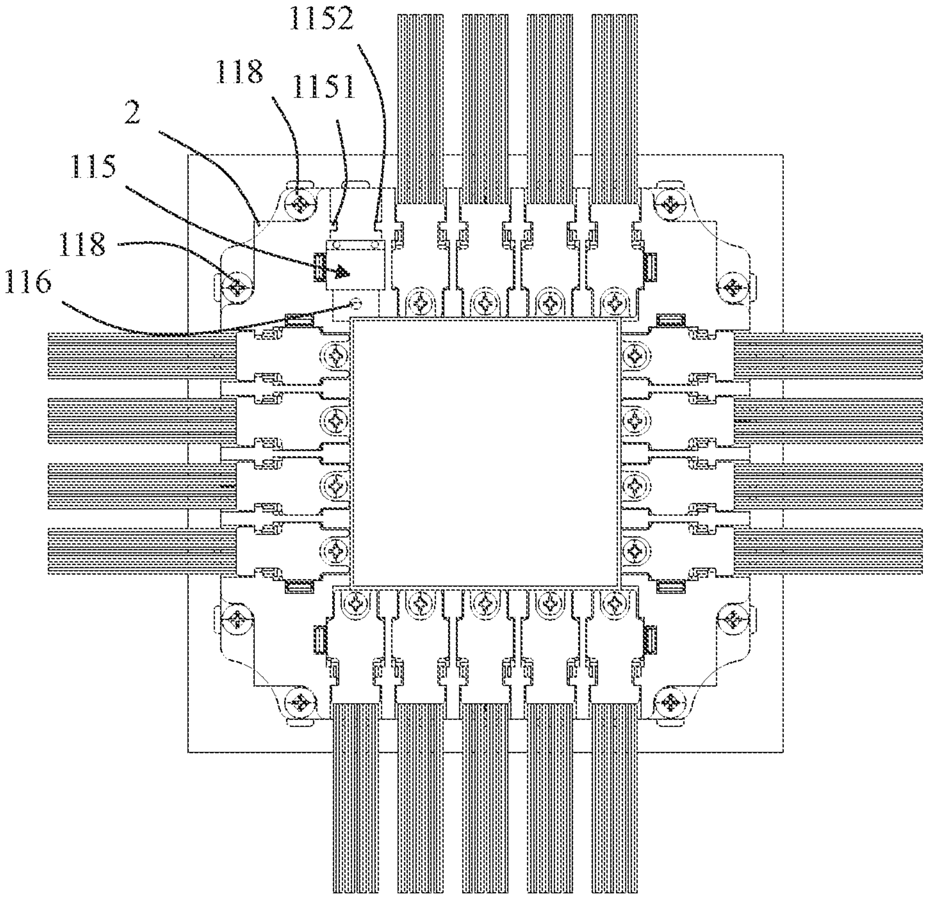
FIG. 9 is a top view of FIG. 7 after removing cable connectors, pressing blocks and fastening members which have been separated in FIG. 7.

As shown in FIG. 9 and FIG. 12, the side wall includes a first protrusion 1151 protruding into the receiving groove 115 and a second protrusion 1152 protruding into the receiving groove 115. The first protrusion 1151 protrudes toward the second protrusion 1152. The second protrusion 1152 protrudes toward the first protrusion 1151. The first protrusion 1151 and the second protrusion 1152 can limit the cable connector 3 to a certain extent when the cable connector 3 is assembled. In addition, the side wall further includes a second mounting hole 116. The second mounting hole 116 is adjacent to the opening 110.

In the illustrated embodiment of the present disclosure, the first bracket 11 is provided with a plurality of first through holes 117 adjacent to its four corners. Preferably, the first bracket 11 is made of metal material to improve heat dissipation performance.

Figure 2:
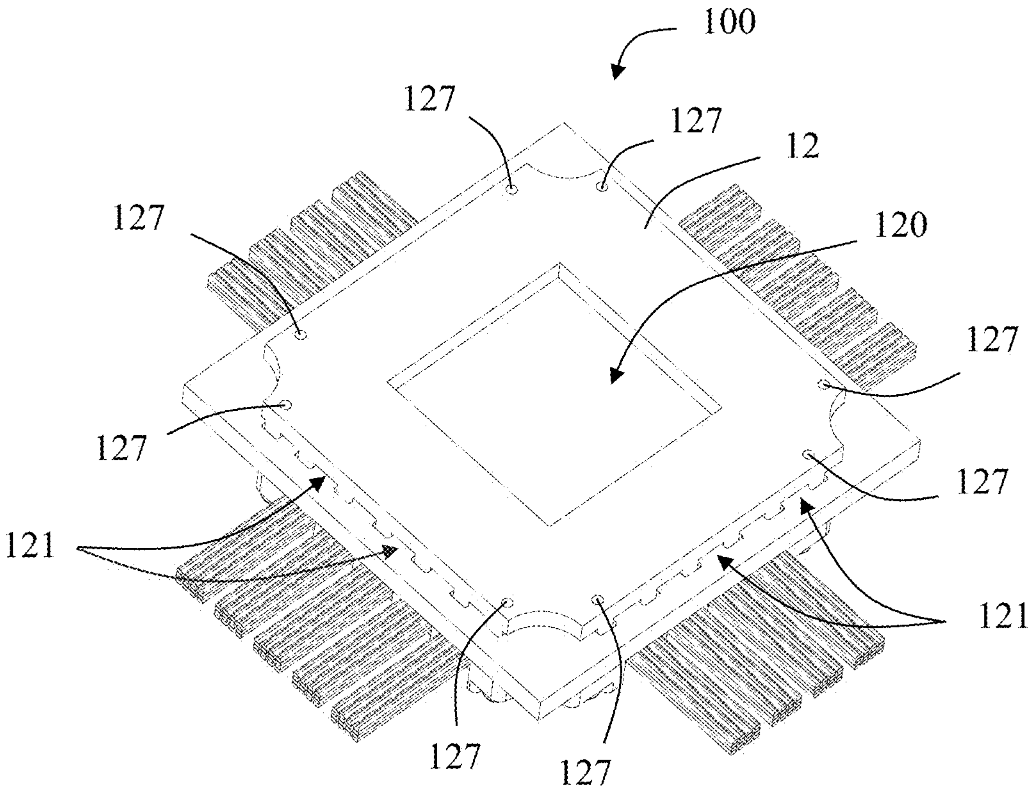
FIG. 2 is a schematic perspective view of FIG. 1 from another angle.

As shown in FIG. 2, the second bracket 12 is also substantially in a shape of a frame, which includes four side walls and a central opening 120 surrounded by the four side walls. The central opening 120 extends through the second bracket 12 along a top-bottom direction to improve heat dissipation. The second bracket 12 has a plurality of second through holes 127 adjacent to its four corners. Preferably, the second bracket 12 is made of metal material to improve heat dissipation performance. The second bracket 12 defines a plurality of heat dissipation channels 121 communicating with the central opening 120, and the plurality of heat dissipation channels 121 is disposed around the central opening 120.

Figure 3:
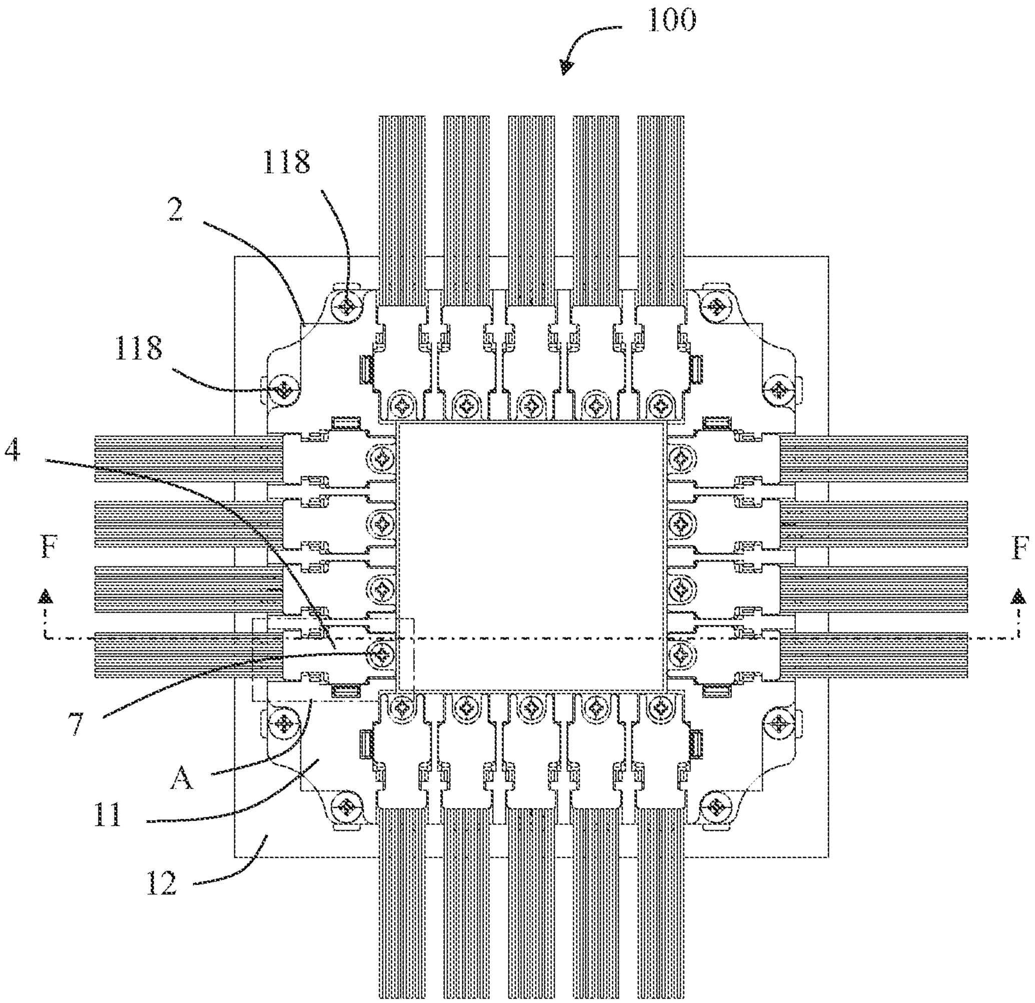
FIG. 3 is a top view of FIG. 1.
Figure 4:
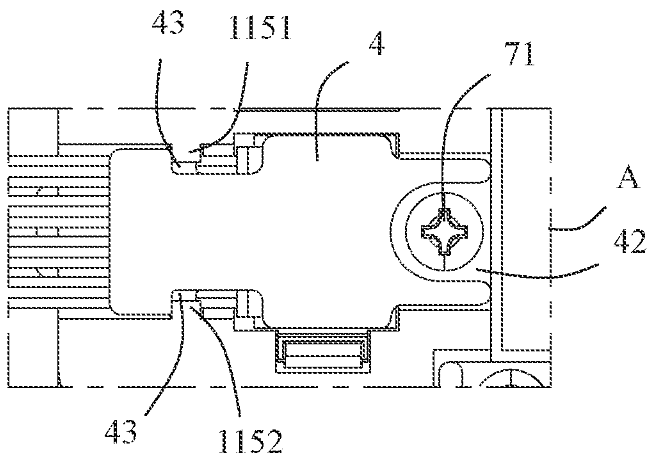
FIG. 4 is a partial enlarged view of a frame portion A in FIG. 3.
Figure 5:
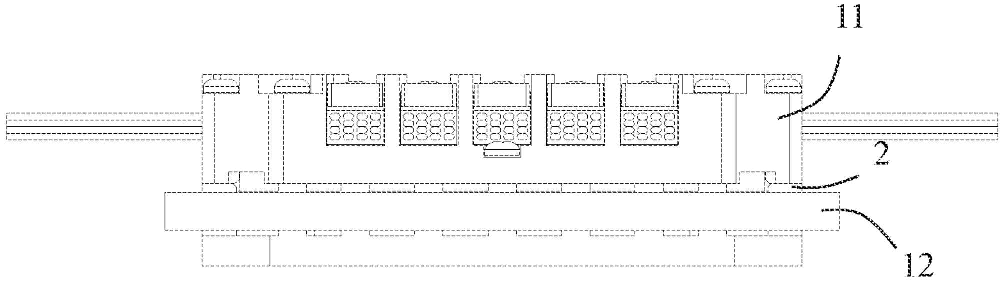
FIG. 5 is a front view of FIG. 1.

Referring to FIG. 1 to FIG. 3, the first through-holes 117 and the second through-holes 127 at corresponding positions are vertically aligned. The connector module 100 is also provided with a plurality of fasteners 118 passing through the first through holes 117 and the second through holes 127 to assemble and fix the first bracket 11 and the second bracket 12 together. In the illustrated embodiment of the present disclosure, the fasteners 118 are located on an outside of the circuit board 2. As a result, the circuit board 2 does not need to be provided with any through holes for the fasteners 118 to pass through, so that it is beneficial to utilize the wiring space of the circuit board 2 to the greatest extent.

Figure 10:
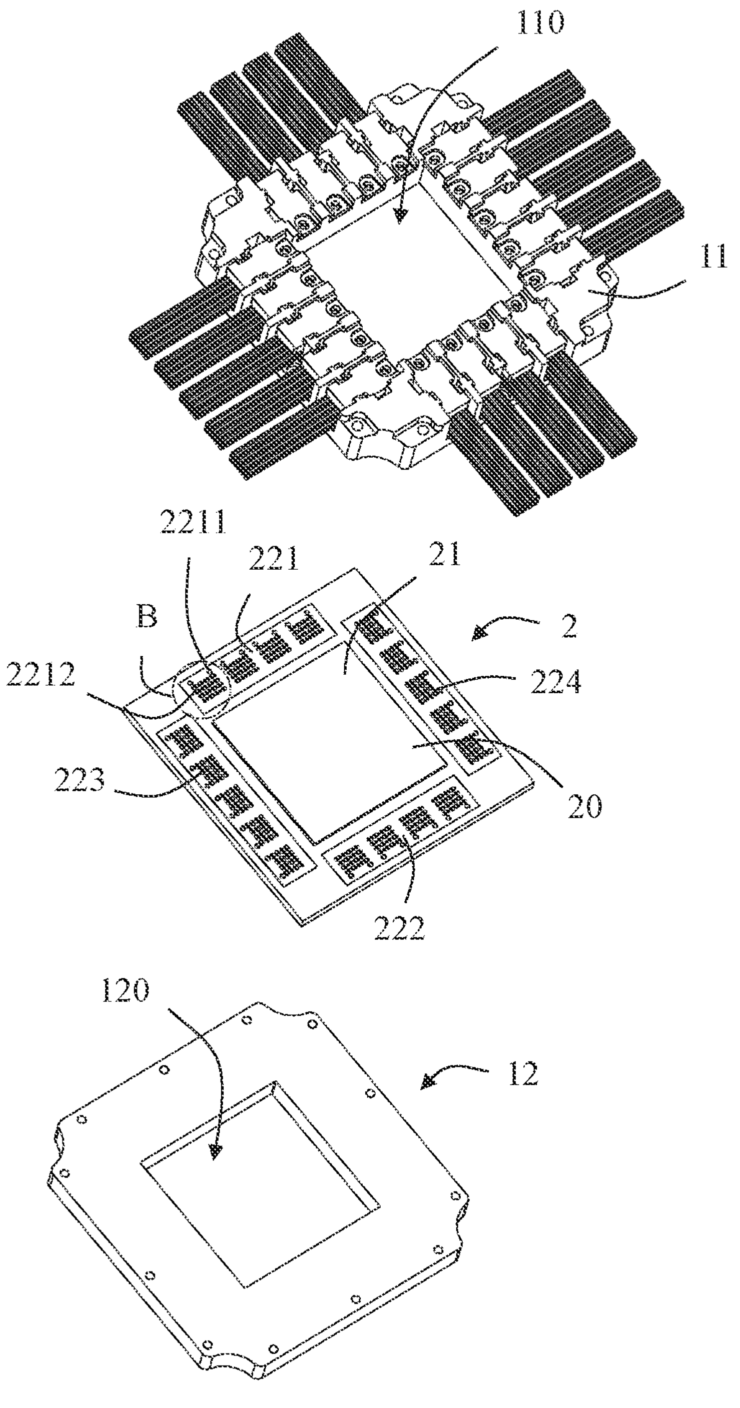
FIG. 10 is a partially exploded perspective view of the connector module of the present disclosure, in which a second bracket and a circuit board are separated.
Figure 11:
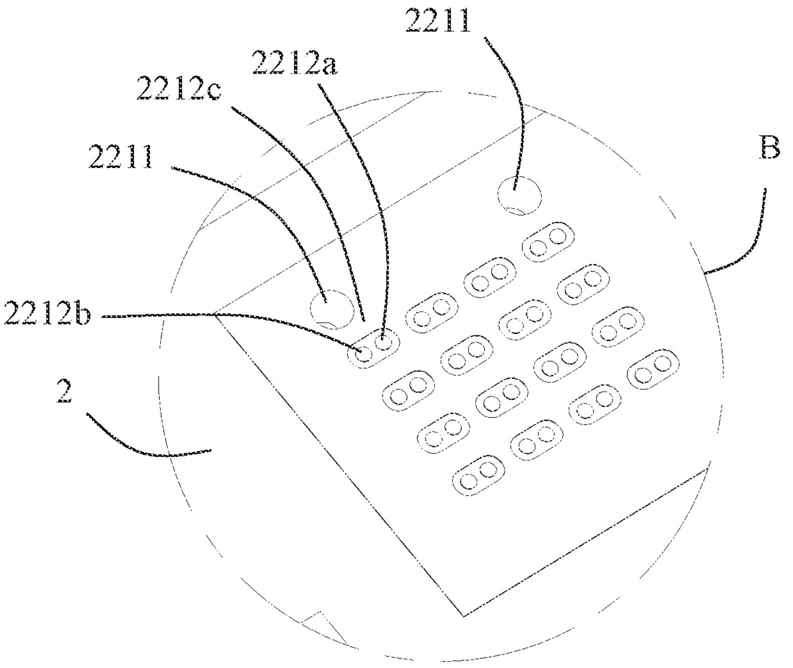
FIG. 11 is a partially enlarged view of a circled portion B in FIG. 10.

Referring to FIG. 10 and FIG. 11, the circuit board 2 includes a middle portion 21 and peripheral portions around the middle portion 21. The peripheral portions include a first peripheral portion 221 corresponding to the first side wall 1, a second peripheral portion 222 corresponding to the second side wall 112, a third peripheral portion 223 corresponding to the third side wall 113, and a fourth peripheral portion 224 corresponding to the fourth side wall 114. In the illustrated embodiment of the present disclosure, the middle portion 21 is configured to mount a chip 20 (such as a central processing unit, CPU). The chip 20 corresponds to the opening 110, that is, the chip 20 is exposed in the opening 110. Since the opening 110 is opened upwardly, it is beneficial to the heat dissipation of the chip 20.

In the illustrated embodiment of the present disclosure, the structures of the first peripheral portion 221, the second peripheral portion 222, the third peripheral portion 223 and the fourth peripheral portion 224 are similar. In the following, only one peripheral portion (for example, the first peripheral portion 221) is used as an example for description.

Referring to FIG. 11, the peripheral portion is provided with at least one positioning hole 2211 and a plurality of conductive elements. In the illustrated embodiment of the present disclosure, the plurality of conductive elements are a plurality of conductive pads 2212. The plurality of conductive pads 2212 are located outside the chip 20. The plurality of conductive pads 2212 include a first signal conductive pad **2212*a*, a second signal conductive pad 2212*b*, and a ground conductive pad 2212*c* surrounding an outer circumference of the first signal conductive pad 2212*a* and the second signal conductive pad 2212*b*. In the illustrated embodiment of the present disclosure, the first signal conductive pad 2212*a* and the second signal conductive pad 2212*b* adjacent to the first signal conductive pad 2212*a* form a signal conductive pair. Preferably, the ground conductive pad 2212*c* is disposed around the outer periphery of the signal conductive pair. In other words, the ground conductive pad 2212*c* is arranged around an outer circumference of the signal conductive pair in a 3600 manner, so as to better shield the signal conductive pair and improve the quality of signal transmission. In the illustrated embodiment of the present disclosure, heights of the first signal conductive pad 2212*a*, the second signal conductive pad 2212*b* and the ground conductive pad 2212*c*** are the same.

Figure 7:
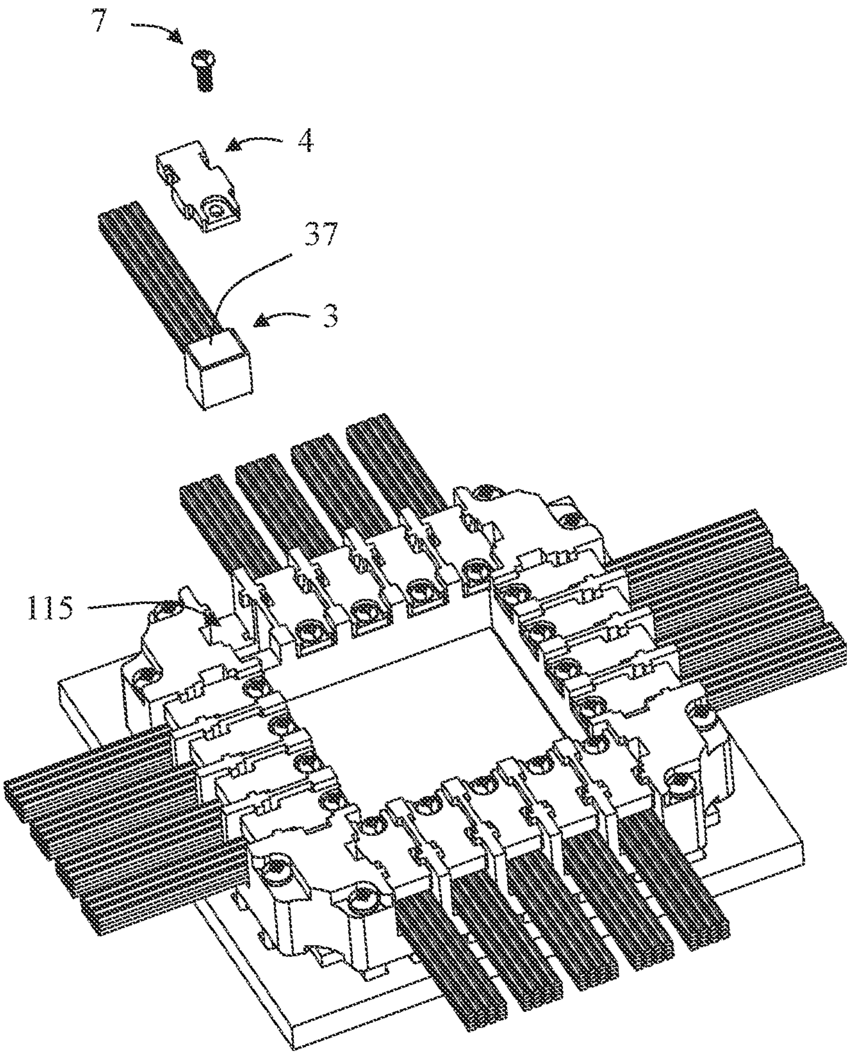
FIG. 7 is a further partial perspective exploded view of FIG. 6.
Figure 8:
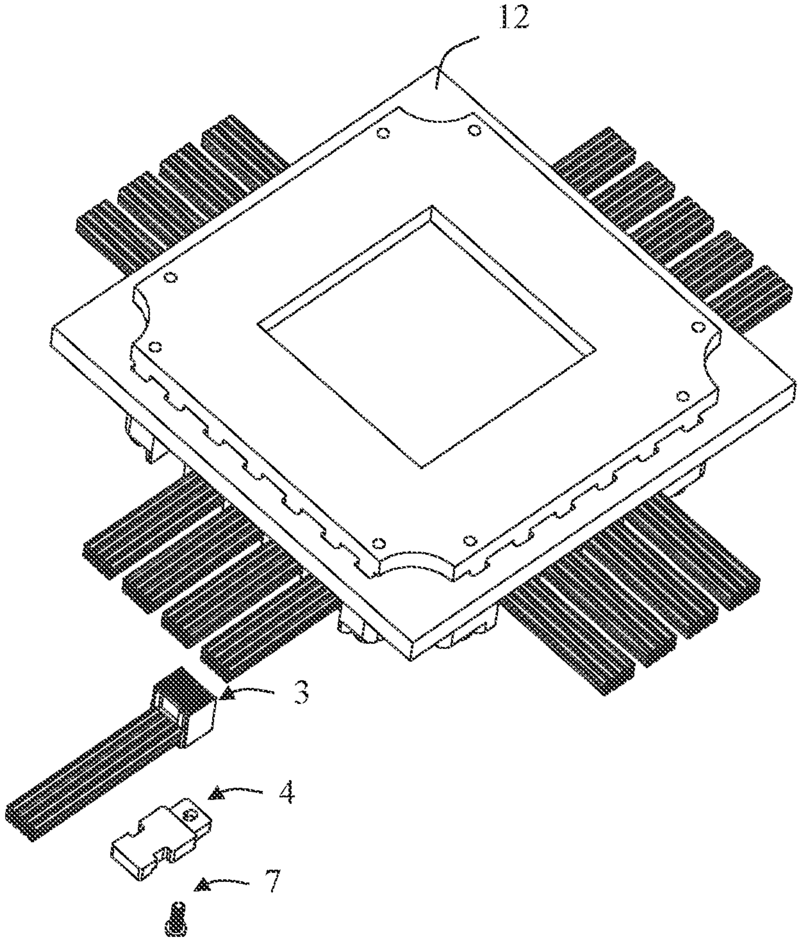
FIG. 8 is a partial perspective exploded view of FIG. 7 from another angle.

Referring to FIG. 7 and FIG. 12, the cable connectors 3 are received in corresponding receiving grooves 115. In the embodiment shown in the present disclosure, the cable connectors 3 are roughly divided into four groups, and are installed on the first side wall 111, the second side wall 112, the third side wall 113 and the fourth side wall 114, respectively. Referring to FIG. 17 to FIG. 23, in the embodiment illustrated in the present disclosure, each cable connector 3 includes a plurality of conductive terminals 31, a plurality of cables 32, a first shielding sheet 33 and a second shielding sheet 34.

Figure 23:
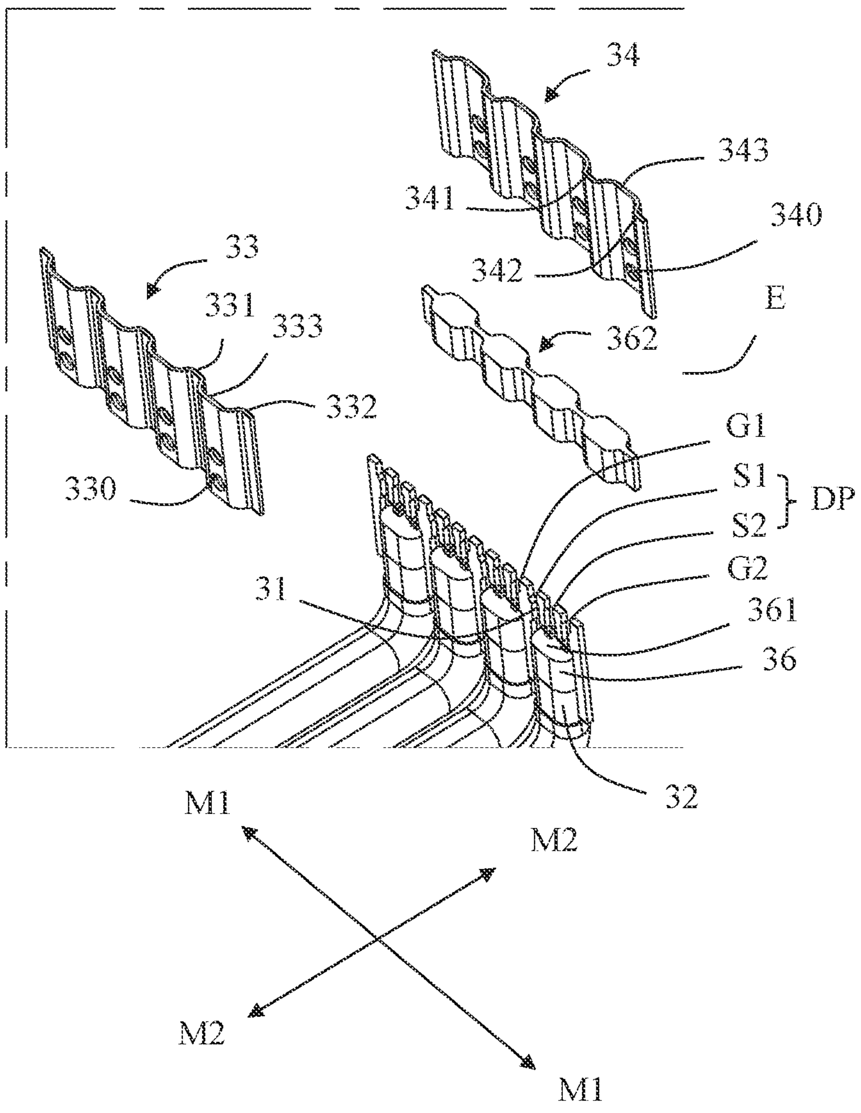
FIG. 23 is a partially enlarged view of a frame portion E in FIG. 22.

As shown in FIG. 23, the plurality of conductive terminals 31 include a first signal terminal S1, a second signal terminal S2, a first ground terminal G1 and a second ground terminal G2. The first signal terminal S1 and the second signal terminal S2 form a signal terminal pair DP. The first ground terminal G1 and the second ground terminal G2 are located on two sides of the pair of signal terminals DP, respectively, along a first direction M1-M1.

The first shielding sheet 33 includes a first contact portion 331, a second contact portion 332, and a first protrusion 333 located between the first contact portion 331 and the second contact portion 332. In the illustrated embodiment of the present disclosure, the first protrusion 333 is provided with a first opening 330. Referring to FIG. 23, in the first embodiment of the present disclosure, the first opening 330 is a circular hole.

The second shielding sheet 34 includes a third contact portion 341, a fourth contact portion 342, and a second protrusion 343 located between the third contact portion 341 and the fourth contact portion 342. In the illustrated embodiment of the present disclosure, the second protrusion 343 is provided with a second opening 340. Referring to FIG. 23, in the first embodiment of the present disclosure, the second opening 340 is a circular hole.

Figure 24:
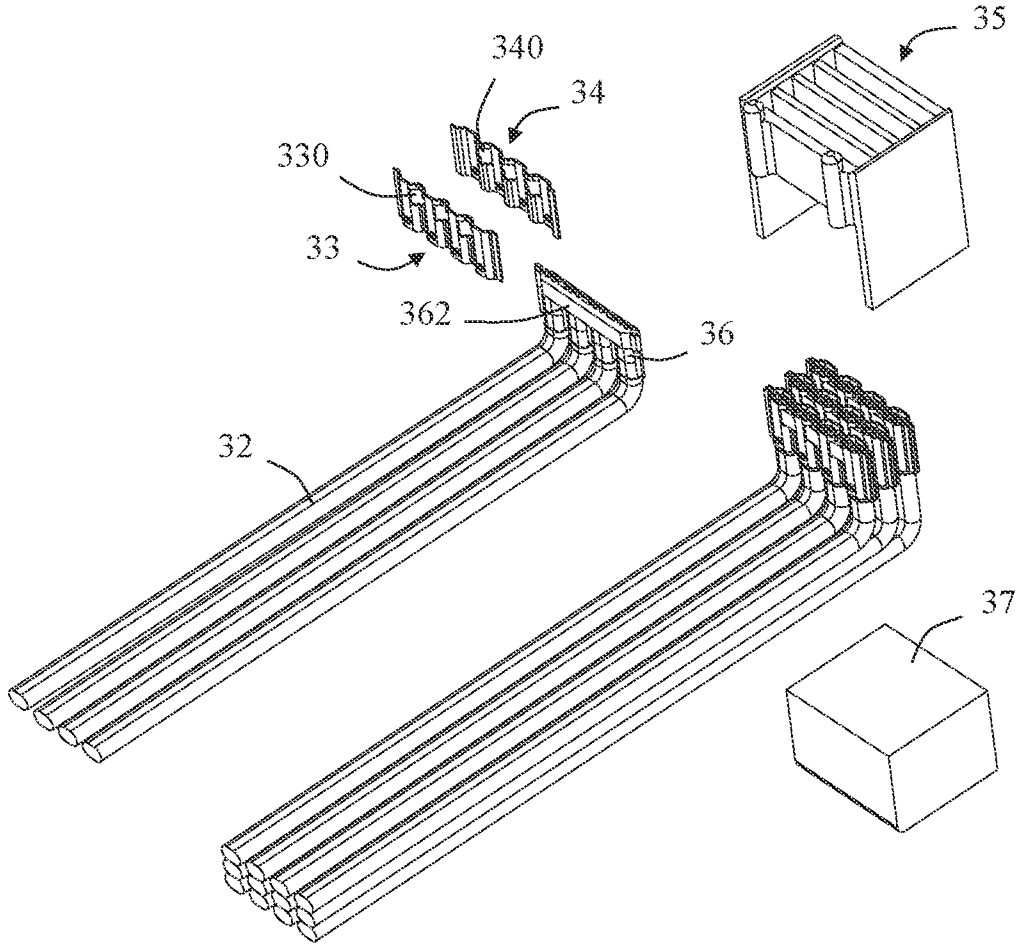
FIG. 24 is a partially exploded perspective view of a cable connector in accordance with another embodiment of the present disclosure.
Figure 25:
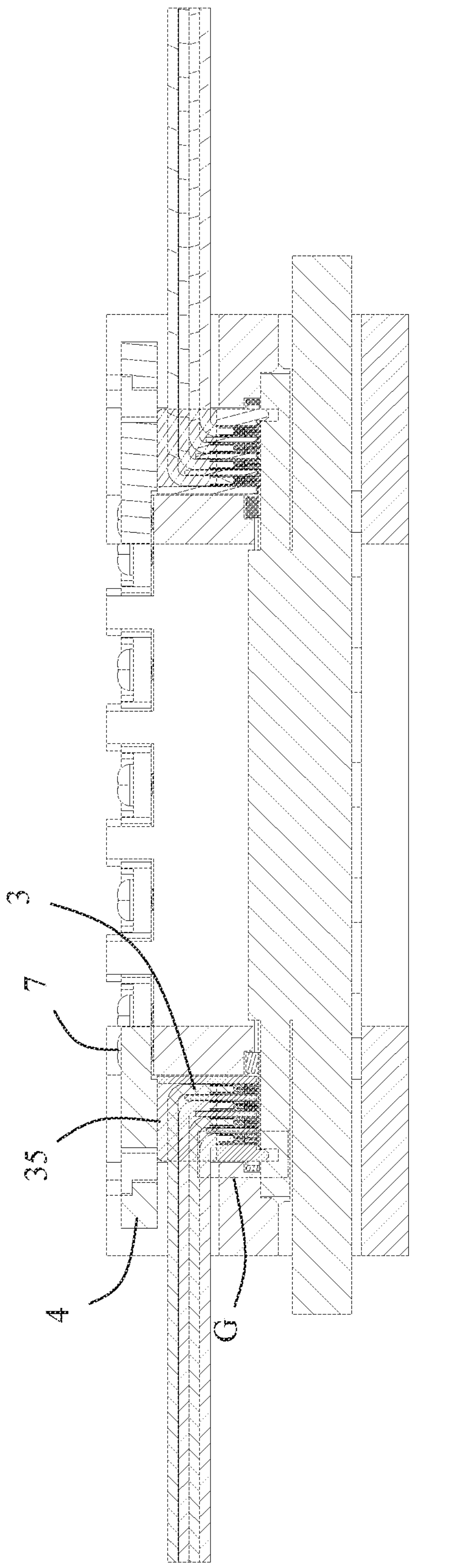
FIG. 25 is a schematic cross-sectional view taken along line F-F in FIG. 9.
Figure 26:
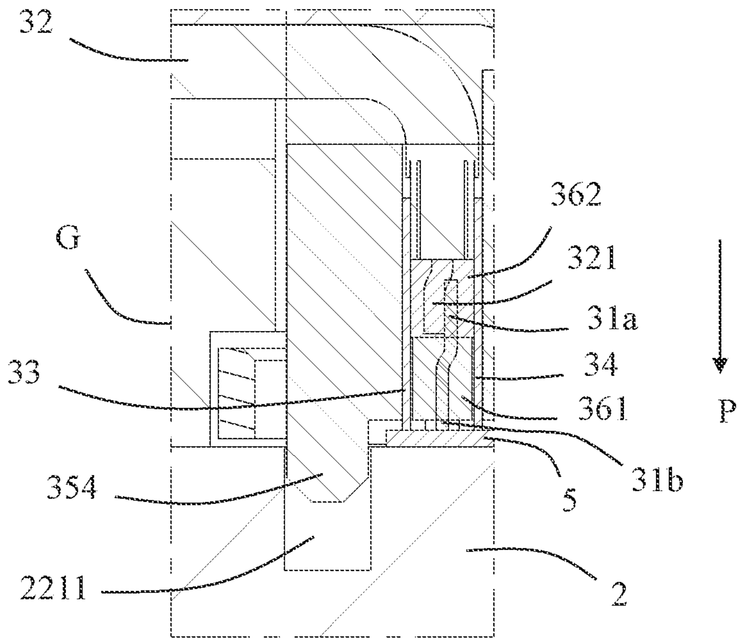
FIG. 26 is a partial enlarged view of a frame portion G in FIG. 25.

Referring to FIG. 24, in the second embodiment of the present disclosure, the first opening 330 and the second opening 340 may also be rectangular holes.

Of course, it is understandable to those skilled in the art that, in some embodiments, the first shielding sheet 33 may not be provided with the first opening 330, and the second shielding sheet 34 may also not be provided with the second opening 340, which is beneficial to achieve a better shielding effect.

Figure 21:
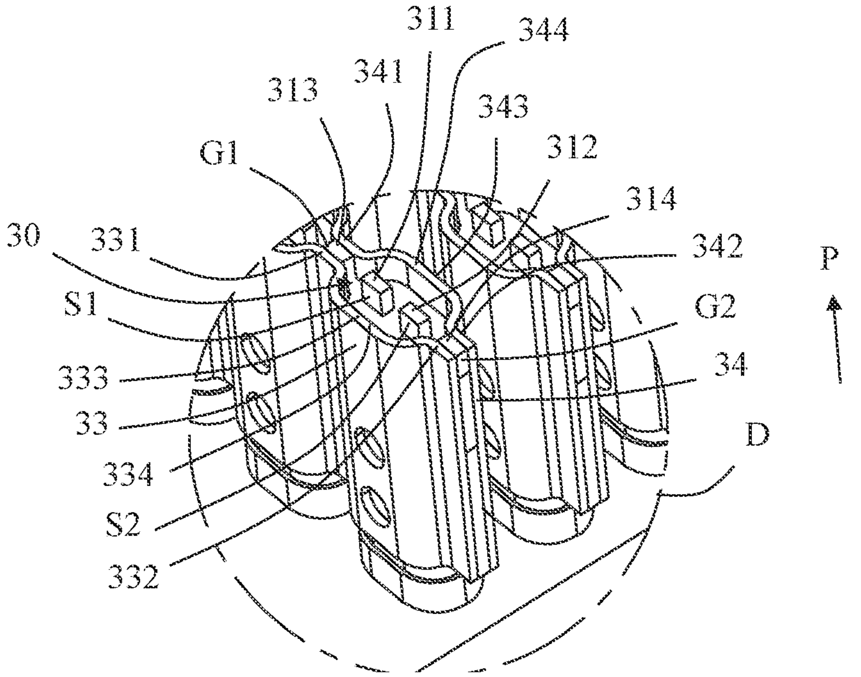
FIG. 21 is a partially enlarged view of a circled portion D in FIG. 20.
Figure 22:
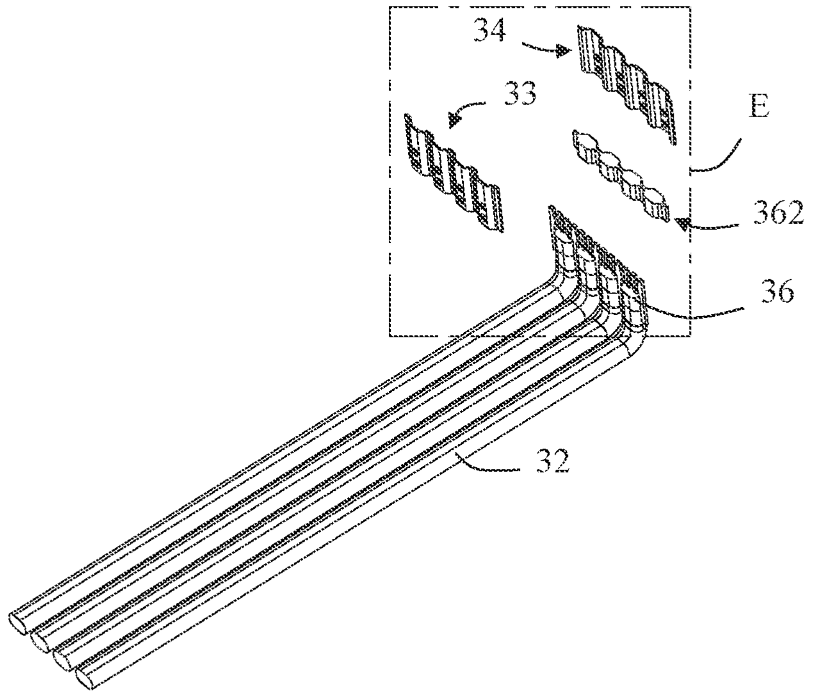
FIG. 22 is a further partial perspective exploded view of FIG. 20 after removing an insulating block.

The first shielding sheet 33 and the second shielding sheet 34 are located on two sides of the signal terminal pair DP respectively, along a second direction M2-M2 perpendicular to the first direction M1-M1. The first protrusion 333 protrudes away from the second shielding sheet 34. The second protrusion 343 protrudes away from the first shielding sheet 33. The first contact portion 331 and the third contact portion 341 are in contact with two sides of the first ground terminal G1, respectively. The second contact portion 332 and the fourth contact portion 342 are in contact with two sides of the second ground terminal G2, respectively. Referring to FIG. 21, the first contact portion 331, the first ground terminal G1, the third contact portion 341, the first protrusion 333, the second protrusion 343, the second contact portion 332, the second ground terminal G2 and the fourth contact portion 342 are enclosed together to form a surrounding shielding cavity 30. The first signal terminal S1 and the second signal terminal S2 are located in the shielding cavity 30. In the embodiment shown in the present disclosure, the first contact portion 331, the first ground terminal G1, the third contact portion 341, the first protrusion 333, the second protrusion 343, the second contact portion 332, the second ground terminal G2, and the fourth contact portion 342 surround a periphery of the first signal terminal S1 and the second signal terminal S2 in a 360° manner.

A general concept of the first shielding sheet 33 and the second shielding sheet 34 is a shielding sheet. In the illustrated embodiment of the present disclosure, the shielding sheet includes the first shielding sheet 33 and the second shielding sheet 34 which are separate components. Of course, in other embodiments, the shielding sheet may also be an integral/one-piece shielding sheet, which is equivalent to setting the first shielding sheet 33 and the second shielding sheet 34 as a whole.

In the embodiment shown in the present disclosure, the first signal terminal S1, the second signal terminal S2, the first ground terminal G1, the second ground terminal G2, the first shielding sheet 33 and the second shielding sheet 34 are all hard structures, that is, their elasticity is almost negligible. It should be noted that, in the present disclosure, the first signal terminal S1, the second signal terminal S2, the first ground terminal G1, the second ground terminal G2, the first shielding sheet 33 and the second shielding sheet 34 need to have relatively high hardness so that they can be directly or indirectly contacted with the corresponding conductive elements by being pressed, so as to finally realize electrical connection with the corresponding conductive elements. It is understandable to those skilled in the art that the pressing method of the present disclosure is completely different from the mounting method in the related art in which the conductive terminals adopt the design of the elastic arms and elastically abut against the conductive elements through certain surfaces of the elastic arms.

Specifically, the first signal terminal S1 includes a first mating surface 311. The second signal terminal S2 includes a second mating surface 312. The first ground terminal G1 includes a third mating surface 313. The second ground terminal G2 includes a fourth mating surface 314. The first mating surface 311, the second mating surface 312, the third mating surface 313 and the fourth mating surface 314 are located in a same plane. In other words, in the illustrated embodiment of the present disclosure, the first mating surface 311, the second mating surface 312, the third mating surface 313 and the fourth mating surface 314 are located at a same height. The first mating surface 311, the second mating surface 312, the third mating surface 313, and the fourth mating surface 314 are configured to be electrically connected to the corresponding conductive elements of the circuit board 2 by being pressed.

Referring to FIG. 19, FIG. 21, FIG. 26 and FIG. 31, the conductive terminals 31 are configured to be pressed against the conductive elements along a pressing direction P. The first mating surface 311, the second mating surface 312, the third mating surface 313 and the fourth mating surface 314 are all perpendicular to the pressing direction P. In the illustrated embodiment of the present disclosure, the pressing direction P is a top-to-bottom direction. The first mating surface 311, the second mating surface 312, the third mating surface 313 and the fourth mating surface 314 are lower surfaces of the first signal terminal S1, the second signal terminal S2, the first ground terminal G1 and the second ground terminal G2, respectively. The lower surfaces are located in a horizontal plane. In other words, the first signal terminal S1, the second signal terminal S2, the first ground terminal G1 and the second ground terminal G2 all extend along a terminal extending direction. The first mating surface 311, the second mating surface 312, the third mating surface 313 and the fourth mating surface 314 are all perpendicular to the terminal extending direction.

Referring to FIG. 21, in the illustrated embodiment of the present disclosure, the first shielding sheet 33 is provided with a fifth mating surface 334, and the second shielding sheet 34 is provided with a sixth mating surface 344. The first mating surface 311, the second mating surface 312, the third mating surface 313, the fourth mating surface 314, the fifth mating surface 334 and the sixth mating surface 344 are located in the same plane. The fifth mating surface 334 and the sixth mating surface 344 are configured to be electrically connected to a corresponding ground conductive pad 2212*c* on the circuit board 2 by being pressed.

In one embodiment, the first mating surface 311, the second mating surface 312, the third mating surface 313, the fourth mating surface 314, the fifth mating surface 334 and the six mating surface 344 are configured to be directly pressed against the corresponding conductive elements of the circuit board 2, so as to realize electrical connection.

Figure 27:
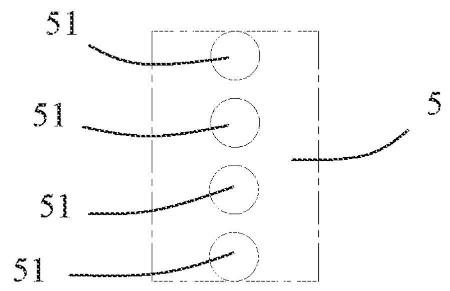
FIG. 27 is a schematic view of a state of the conductive film when it is not pressed.
Figure 28:
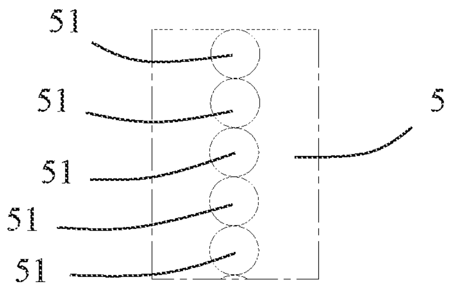
FIG. 28 is a schematic view of a state of the conductive film in FIG. 27 when it is pressed.
Figure 29:
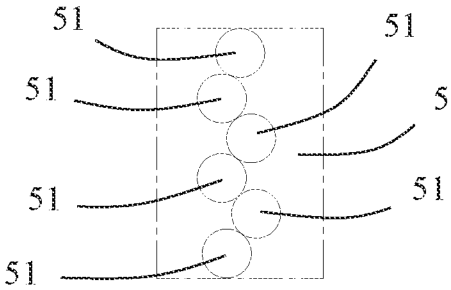
FIG. 29 is a schematic view of another state of the conductive film in FIG. 27 when it is pressed.
Figure 30:
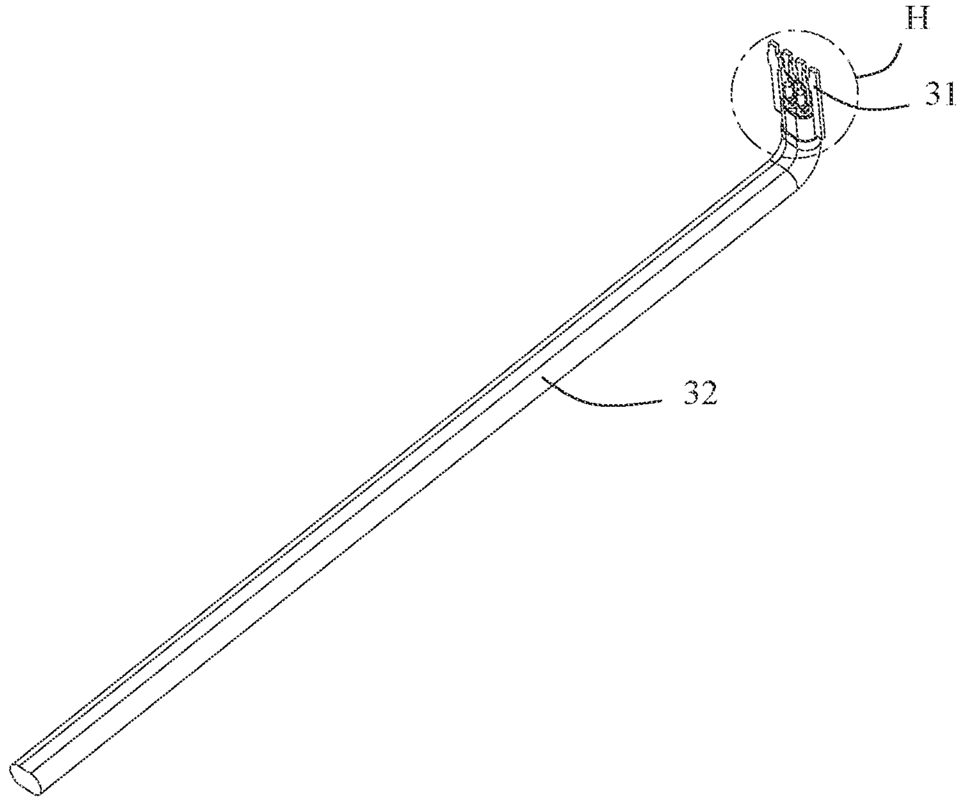
FIG. 30 is a schematic perspective view of a cable connected to a first signal terminal, a second signal terminal, a first ground terminal, and a second ground terminal.
Figure 31:
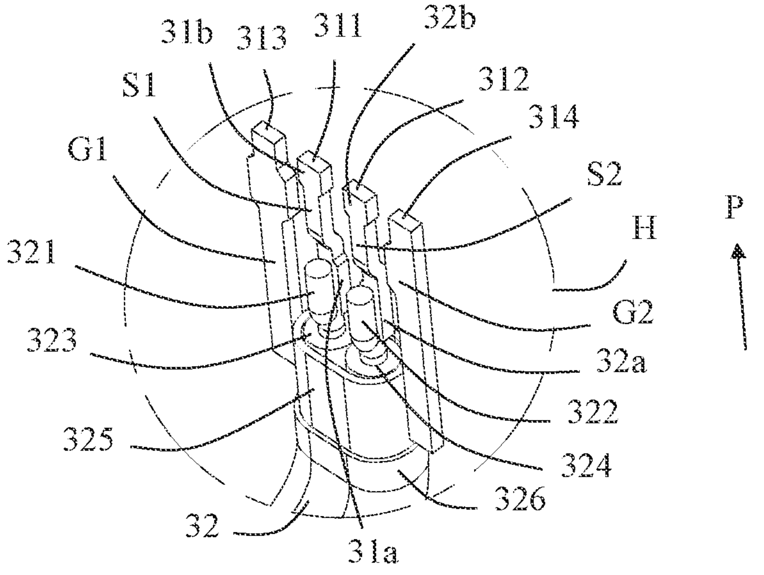
FIG. 31 is a partial enlarged view of a circled portion H in FIG. 30.

Referring to FIG. 13 to FIG. 16, in another embodiment, the connector module 100 further includes a conductive film 5. Referring to FIG. 27, in the pressing direction of the conductive film 5, the conductive film 5 includes a plurality of conductive particles 51. When the conductive film 5 is not pressed, the plurality of conductive particles 51 are spaced apart from each other by a certain distance, so that the conductive film 5 does not have conductivity. Referring to FIG. 28 and FIG. 29, when the conductive film 5 is pressed, the adjacent conductive particles 51 contact each other, so that the conductive film 5 has conductivity.

The first mating surface 311, the second mating surface 312, the third mating surface 313, the fourth mating surface 314, the fifth mating surface 334 and the sixth mating surface 344 are configured to be in contact with the conductive film 5. The conductive film 5 covers the conductive elements of the circuit board 2. The first mating surface 311, the second mating surface 312, the third mating surface 313, the fourth mating surface 314, the fifth mating surface 334 and the sixth mating surface 344 are configured to be indirectly contacted with the corresponding conductive elements on the circuit board 2 by being pressed and via the conductive film 5, so as to realize electrical connection. Compared with a way of direct contact, by providing the conductive film 5, it is beneficial to protect the conductive elements of the circuit board 2, reduce the risk of the conductive elements being scratched, and improve product reliability.

Figure 20:
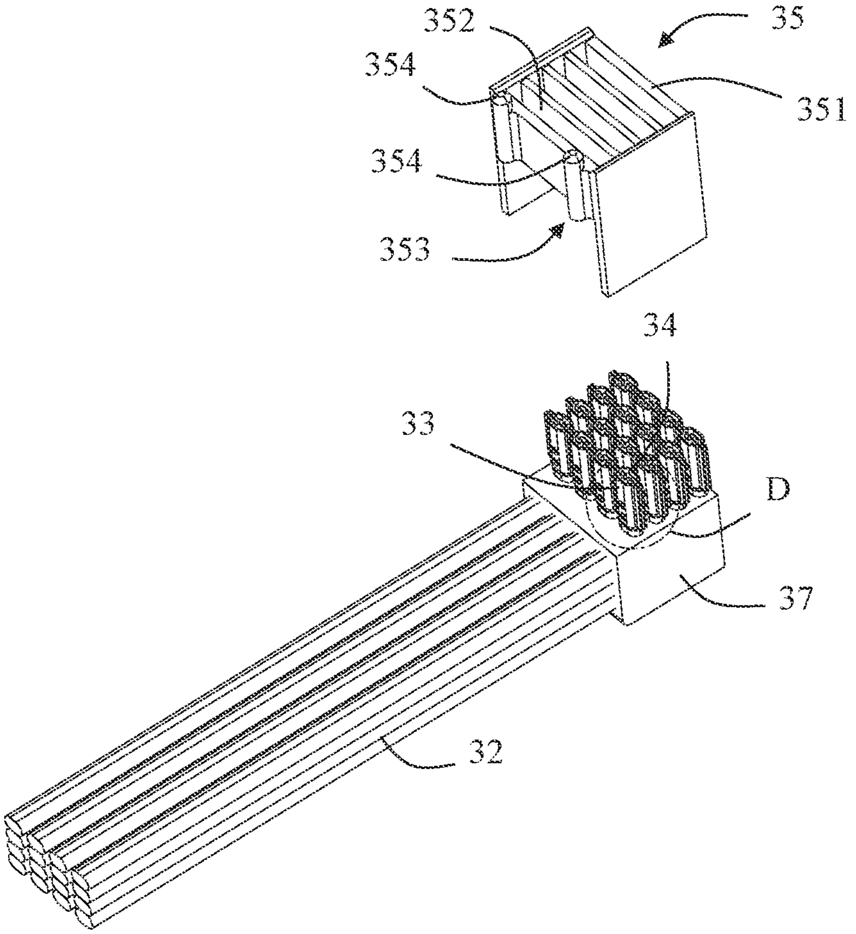
FIG. 20 is a partial perspective exploded view of the cable connector in FIG. 8.

Referring to FIG. 20, in the embodiment illustrated in the present disclosure, the cable connector 3 further includes a body 35. The plurality of conductive terminals 31 are fixed to the body 35. In the illustrated embodiment of the present disclosure, the body 35 is made of metal material. The plurality of conductive terminals 31 are fixed to the body 35 by assembling.

The body 35 includes a mounting surface 351, a plurality of mounting grooves 352 extending through the mounting surface 351, an installation space 353 communicating with the plurality of mounting grooves 352, and at least one positioning post 354 protruding from the mounting surface 351. The positioning post 354 is used for being inserted into the positioning hole 2211 of the circuit board 2 to achieve positioning. In the embodiment shown in the present disclosure, the first ground terminal G1, the second ground terminal G2, the first signal terminal S1, the second signal terminal S2, the first shielding sheet 33 and the second shielding sheet 34 are received in a corresponding mounting groove 352.

Figure 19:
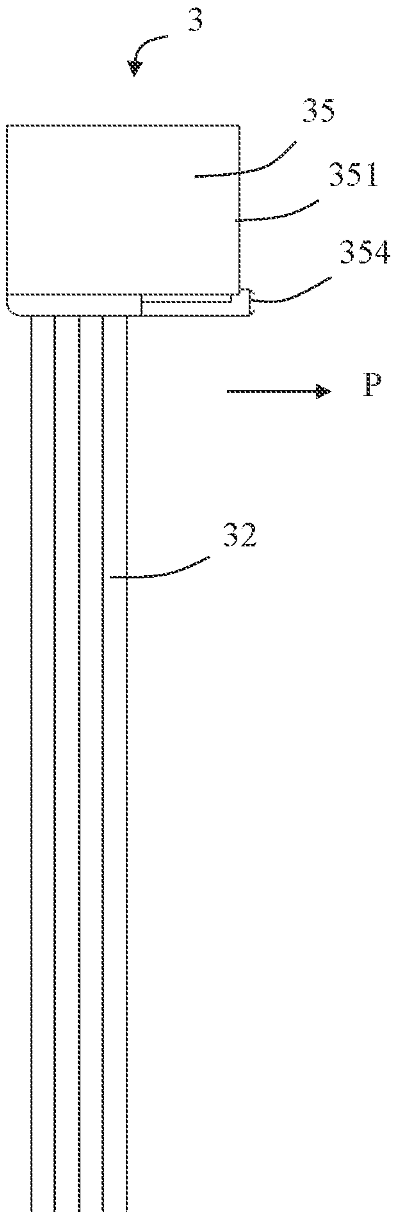
FIG. 19 is a left side view of FIG. 17.

Referring to FIG. 19, the first mating surface 311, the second mating surface 312, the third mating surface 313, the fourth mating surface 314, the fifth mating surface 334 and the sixth mating surface 344 do not protrude beyond the mounting surface 351. In the illustrated embodiment of the present disclosure, the first mating surface 311, the second mating surface 312, the third mating surface 313, the fourth mating surface 314, the fifth mating surface 334 and the sixth mating surface 344 are flush with the mounting surface

351. With this arrangement, on the one hand, it facilitates that when the conductive film 5 is pressed, the mounting surface 351 of the body 35 can also play a certain pressing effect; and on the other hand, the mounting surface 351 of the body 35 can play a certain protective role, which is beneficial to prevent the conductive film 5 from being damaged when the conductive film 5 is pressed against by the first mating surface 311, the second mating surface 312, the third mating surface 313, the fourth mating surface 314, the fifth mating surface 334 and the sixth mating surface 344.

In the present disclosure, the first mating surface 311, the second mating surface 312, the third mating surface 313, the fourth mating surface 314, the fifth mating surface 334 and the sixth mating surface 344 are electrically connected to the corresponding conductive elements on the circuit board 2 in a non-elastic arm pressing manner, which shortens the signal transmission path, saves space, and is beneficial to increase the contact density.

Referring to FIG. 23, FIG. 25, FIG. 26, FIG. 30 and FIG. 31, in the illustrated embodiment of the present disclosure, the cable 32 includes a first core 321, a second core 322, a first insulating layer 323 wrapped on at least part of the first core 321, a second insulating layer 324 wrapped on at least part of the second core 322, a ground shielding layer 325 wrapping on at least part of the first insulating layer 323 and at least part of the second insulating layer 324, and an insulating skin 326 wrapped on at least part of the ground shielding layer 325.

In the illustrated embodiment of the present disclosure, the cable connector 3 includes a terminal module 36. The terminal module 36 includes the first signal terminal S1, the second signal terminal S2, and a first fixing block 361 for fixing the first signal terminal S1 and the second signal terminal S2 together. In the embodiment shown in the present disclosure, the first signal terminal S1 and the second signal terminal S2 are insert-molded in the first fixing block 361. The first signal terminal S1 includes a first tail portion 31*a* protruding beyond the first fixing block 361, and a first abutting portion 31*b* protruding beyond the first fixing block 361 and located opposite to the first tail portion 31*a*. The first tail portion 31*a* is configured to contact the first core 321. The first mating surface 311 is provided on an end surface (for example, an upper end surface) of the first abutting portion 31*b*. Preferably, the first tail portion 31*a* is fixed to the first core 321 by soldering or welding.

Similarly, the second signal terminal S2 includes a second tail portion 32*a* protruding beyond the first fixing block 361, and a second abutting portion 32*b* protruding beyond the first fixing block 361 and located opposite to the second tail portion 32*a*. The second tail portion 32*a* is configured to contact the second core 322. The second mating surface 312 is provided on an end surface (for example, an upper end surface) of the second abutting portion 32*b*. Preferably, the second tail portion 32*b* is fixed to the second core 322 by soldering or welding.

Both the first ground terminal G1 and the second ground terminal G2 are in contact with the ground shielding layer 325. Preferably, both the first ground terminal G1 and the second ground terminal G2 are fixed to the ground shielding layer 325 by soldering or welding. The third mating surface 313 is provided on an end surface (for example, an upper end surface) of the first ground terminal G1. The fourth mating surface 314 is provided on an end surface (for example, an upper end surface) of the second ground terminal G2.

In the illustrated embodiment of the present disclosure, the cable connector 3 further includes a second fixing block 362 fixed on part of the first abutting portion 31*b*, part of the second abutting portion 32*b*, part of the first ground terminal G1 and the second ground terminal G2. In the embodiment shown in the present disclosure, the second fixing block 362 is over-molded on the first abutting portion 31*b*, the second abutting portion 32*b*, the first ground terminal G1 and the second ground terminal G2. The first mating surface 311 of the first signal terminal S1, the second mating surface 312 of the second signal terminal S2, the third mating surface 313 of the first ground terminal G1, and the fourth mating surface 314 of the second ground terminal G2 protrude beyond the second fixing block 362.

Referring to FIG. 20, in the illustrated embodiment of the present disclosure, the cable connector 3 further includes an insulating block 37 over-molded on the plurality of cables 32. The first shielding sheet 33 and the second shielding sheet 34 protrude beyond the insulating block 37. The insulating block 37 is accommodated in the installation space 353 of the body 35.

Referring to FIG. 21, in the embodiment shown in the present disclosure, a portion of the cable 32 that protrudes beyond the insulating block 37 and is located on a same side as the first shielding sheet 33 and the second shielding sheet 34, is shielded by the first shielding sheet 33, the second shielding sheet 34, the first ground terminal G1 and the second ground terminal G2; or shielded by the first shielding sheet 33, the second shielding sheet 34, the first ground terminal G1, the second ground terminal G2 and the ground shielding layer 325. With this arrangement, the cable connector 3 is located on a side where the first mating surface 311, the second mating surface 312, the third mating surface 313 and the fourth mating surface 314 are located. Both the first signal terminal S1 and the second signal terminal S2 protruding beyond the insulating block 37 can be shielded 360° around an extending direction of the terminals (for example, the top-bottom direction), which solves the problem of signal cross-talk during high-speed transmission and improves the quality of signal transmission.

In the illustrated embodiment of the present disclosure, a distance between each of the first mating surface 311, the second mating surface 312, the third mating surface 313, the fourth mating surface 314, the fifth mating surface 334 and the sixth mating surface 344, and the conductive elements of the circuit board 2 is no more than 0.2 mm.

Figure 14:
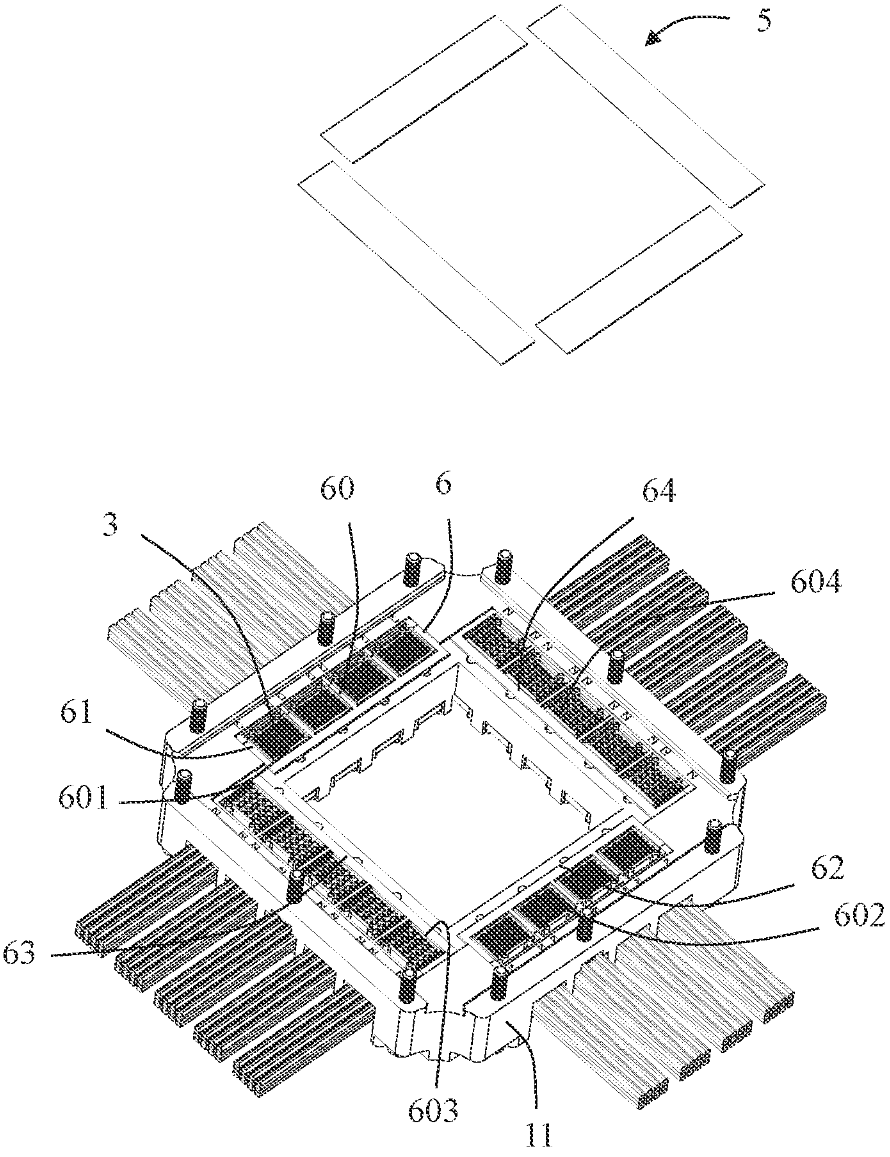
FIG. 14 is a further partial perspective exploded view of FIG. 13, w % herein a conductive film is separated.
Figure 15:
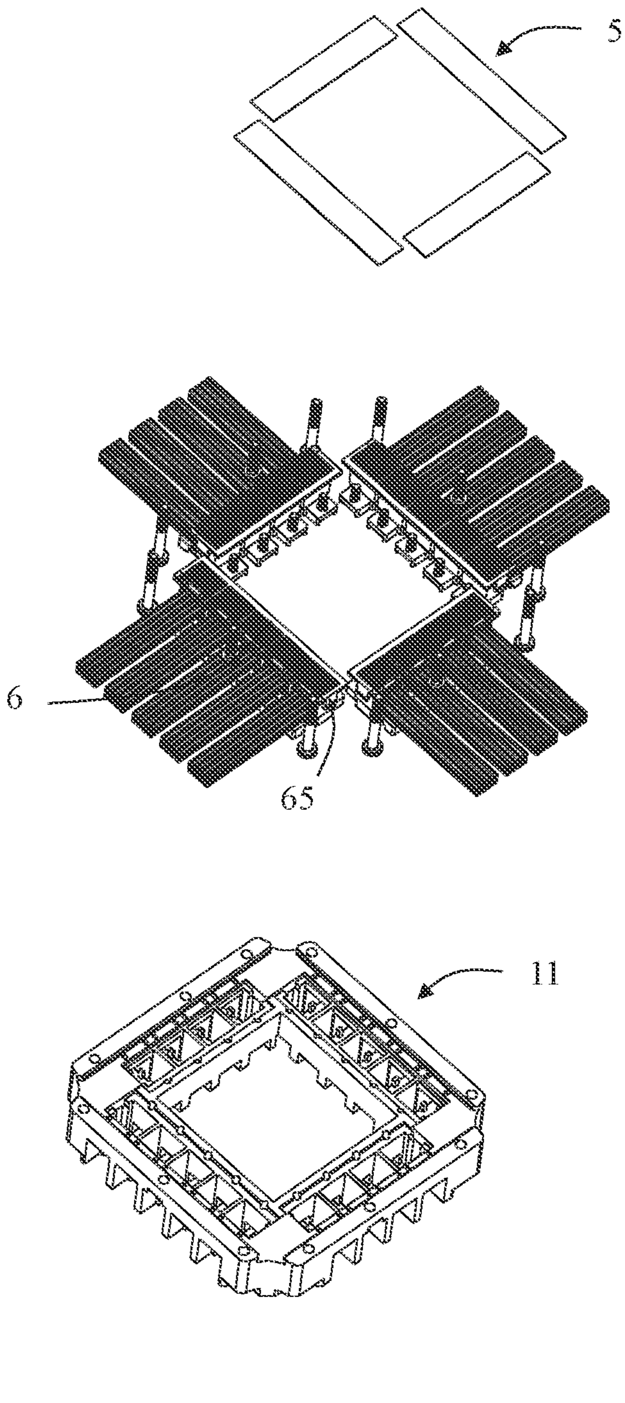
FIG. 15 is a further partial perspective exploded view of FIG. 14, wherein the first bracket is separated.
Figure 16:
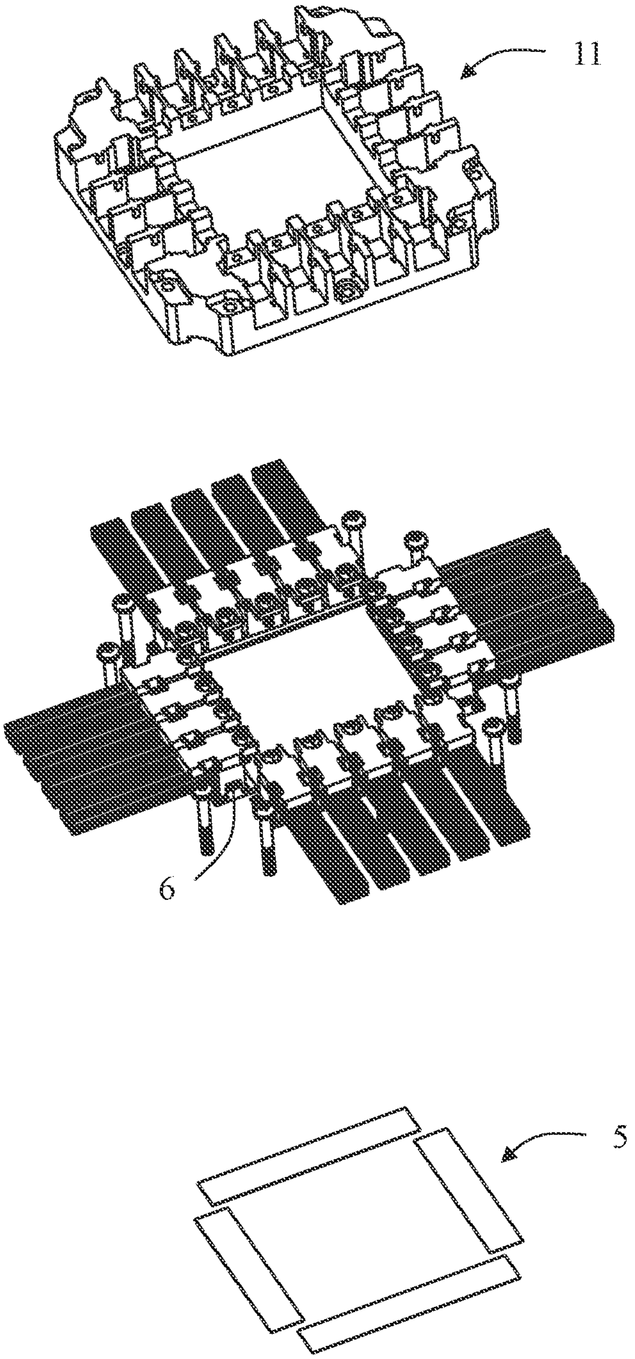
FIG. 16 is a partial perspective exploded view of FIG. 15 from another angle.
Figure 17:
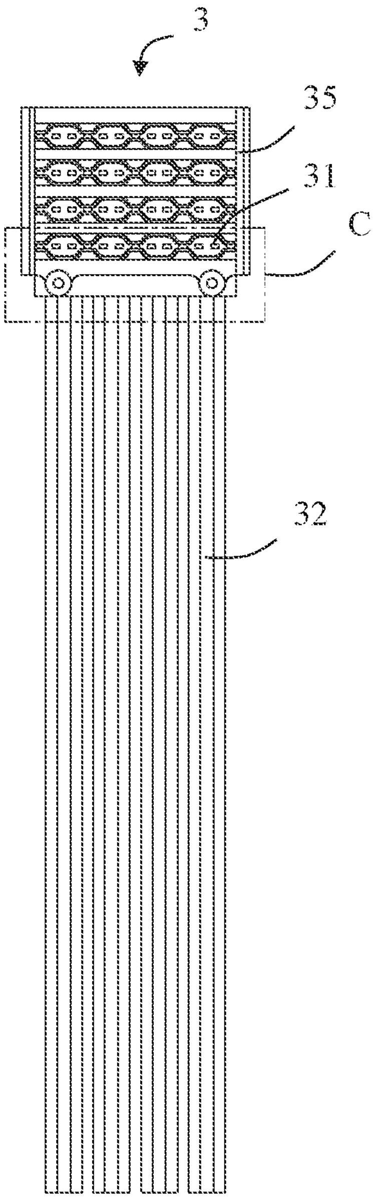
FIG. 17 is a top view of the cable connector in FIG. 8.
Figure 18:
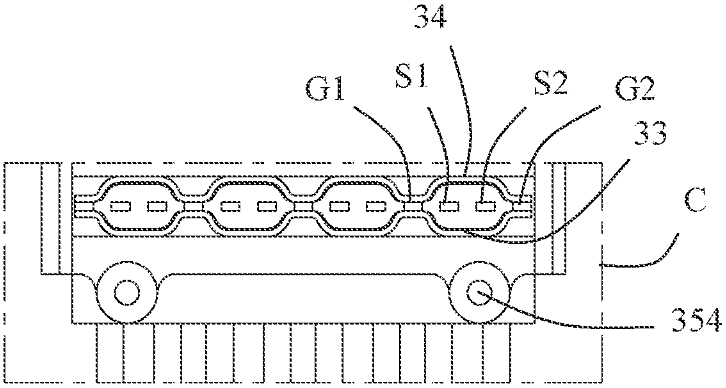
FIG. 18 is a partial enlarged view of a frame portion C in FIG. 17.

Referring to FIG. 14 and FIG. 15, in order to more accurately space the plurality of cable connectors 3, the connector module 100 further includes a limiting bracket 6 assembled to the first bracket 11. The limiting bracket 6 includes a plurality of limiting slots 60 arranged at intervals. The body 35 of the cable connector 3 is positioned in a corresponding limiting slot 60. In the illustrated embodiment of the present disclosure, the limiting bracket 6 includes a first limiting bracket 61, a second limiting bracket 62, a third limiting bracket 63 and a fourth limiting bracket 64. The first limiting bracket 61 is assembled and fixed on the first side wall 111. The second limiting bracket 62 is assembled and fixed on the second side wall 112. The third limiting bracket 63 is assembled and fixed on the third side wall 113. The fourth limiting bracket 64 is assembled and fixed on the fourth side wall 114. The limiting slots 60 include a plurality of first limiting slots 601 provided on the first limiting bracket 61, a plurality of second limiting slots 602 provided on the second limiting bracket 62, a plurality of third limiting slots 603 provided on the third limiting bracket 63, and a plurality of fourth limiting slots 604 provided on the fourth limiting bracket 64. Preferably, in order to achieve better fixation with the first bracket 11, the limiting bracket 6 is further provided with two locking elastic arms 65 at opposite ends thereof.

Figure 6:
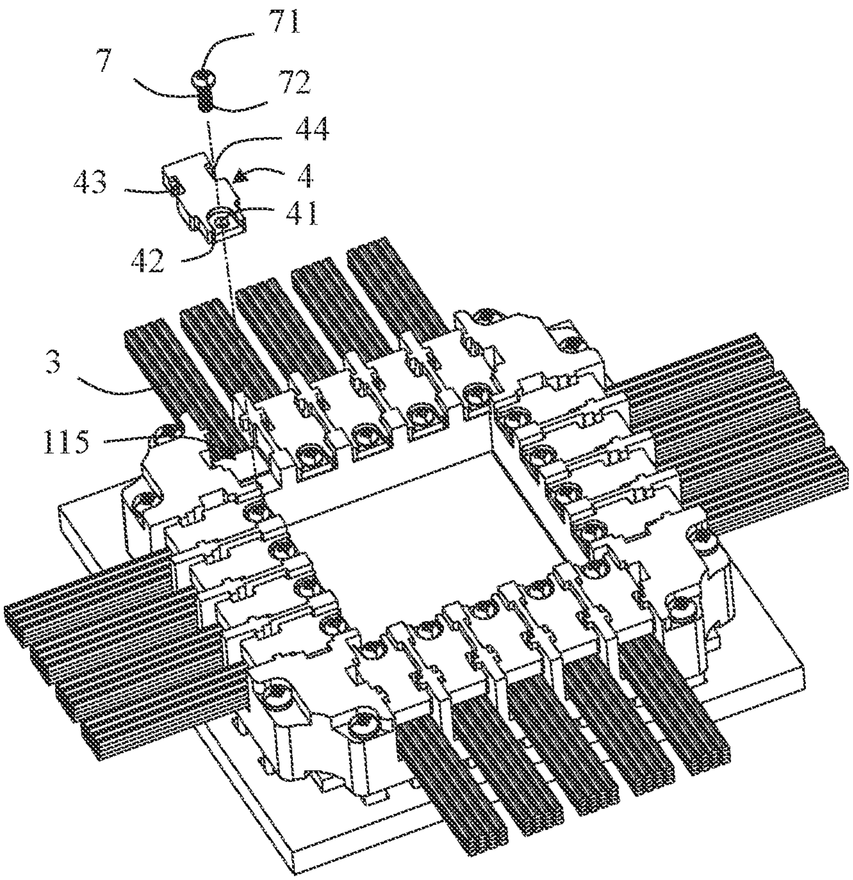
FIG. 6 is a partial perspective exploded view of FIG. 1.

Referring to FIG. 6, in the illustrated embodiment of the present disclosure, a plurality of pressing blocks 4 are provided and abut against corresponding bodies 35. The pressing blocks 4 are assembled and fixed to the bracket 1. The pressing blocks 4 are pressed against the corresponding bodies 35 so as to fix the bodies 35 in the corresponding receiving grooves 115.

Specifically, the pressing block 4 is provided with a first mounting hole 41 which is aligned with the second mounting hole 116. The connector module 100 further includes a fastening member 7 passing through the first mounting hole 41 and the second mounting hole 116. In the illustrated embodiment of the present disclosure, the fastening member 7 is a first bolt. The first bolt includes a head 71 and a threaded portion 72 connected to the head 71. The threaded portion 72 passes through the first mounting hole 41. The threaded portion 72 is at least partially fastened in the second mounting hole 116.

In the illustrated embodiment of the present disclosure, the pressing block 4 includes a notch 42 in which the first mounting hole 41 is located. The head 71 is accommodated in the notch 42. The pressing block 4 includes a first notch 43 on one side and a second notch 44 on the other side. The first protrusion 1151 is accommodated in the first notch 43, and the second protrusion 1152 is received in the second notch 44.

In the present disclosure, by providing the pressure blocks 4 detachably fixed to the first bracket 11, the cable connectors 3 can be assembled and disassembled independently, thereby improving the convenience of maintenance.

The present disclosure also discloses an assembly method of the above-mentioned connector module 100, and the assembly method includes:

- providing the conductive film 5, and installing the conductive film 5 on the bracket 1;
- providing the circuit board 2 and the bracket 1, and fixing the bracket 1 to the circuit board 2;
- providing the cable connector 3, assembling the cable connector 3 into the receiving groove 115 of the bracket 1; and
- providing the pressing block 4, and assembling the pressing block 4 onto the cable connector 3.

The assembly method further includes: providing the fastening member 7, and fixing the pressing block 4 to the bracket 1, so that the pressing block 4 is pressed against the body 35 to fix the body 35 in the receiving groove 115.

The bracket 1 includes a first bracket 11 and a second bracket 12. The conductive film 5 is mounted to the first bracket 11. The circuit board 2 is at least partially clamped between the first bracket 11 and the second bracket 12.

In addition, the assembly method includes a step of assembling the limiting bracket 6, wherein the limiting bracket 6 is assembled to the first bracket 11.

For other steps of the assembly method, please refer to the above description of the connector module 100, which will not be repeated in the present disclosure.

Compared with the prior art, the present disclosure is provided with the bracket 1. The cable connectors 3 are assembled to the bracket 1 to be pressed against the circuit board 2. In addition, the present disclosure can ensure the reliability of the electrical connection between the cable connectors 3 and the circuit board 2 by providing the pressing blocks 4 assembled and fixed to the bracket 1.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A connector module, comprising:

a bracket comprising a first bracket and a second bracket, the first bracket defining at least one receiving groove; the first bracket comprising an opening surrounded by a plurality of side walls; the second bracket being of a frame-shaped configuration, and the second bracket comprises a central opening extending through the second bracket along a vertical direction; and at least one cable connector, the cable connector comprising a body, a plurality of conductive terminals and a plurality of cables connected to the plurality of conductive terminals, the body being at least partially accommodated in the receiving groove, the plurality of conductive terminals being configured to engage with a plurality of conductive elements of a circuit board; the circuit board being at least partially clamped between the first bracket and the second bracket; the circuit board being configured to mount a chip which is exposed in the opening;

wherein the second bracket defines a plurality of heat dissipation channels communicating with the central opening, and the plurality of heat dissipation channels is disposed around the central opening.

2. The connector module according to claim 1, wherein the central opening corresponds to the chip along the vertical direction; and the plurality of conductive elements are disposed surrounding the chip.

3. The connector module according to claim 1, wherein the plurality of side walls comprises a first side wall, a second side wall opposite to the first side wall, a third side wall connecting one end of the first side wall and one end of the second side wall, and a fourth side wall connecting another end of the first side wall and another end of the second side wall; the opening is surrounded by the first side wall, the second side wall, the third side wall and the fourth side wall; the first side wall, the second side wall, the third side wall and the fourth side wall are all provided with a plurality of receiving grooves; and wherein a plurality of cable connectors is provided and correspondingly accommodated in the receiving grooves.

4. The connector module according to claim 3, wherein the first side wall, the second side wall, the third side wall and the fourth side wall form a frame-shaped configuration;

the receiving groove is opened along an opening direction; and the body is at least partially accommodated in the receiving groove along a pressing direction which is opposite to the opening direction.

5. The connector module according to claim 3, further comprising at least one limiting bracket assembled to the first bracket, the limiting bracket comprising a plurality of limiting slots arranged at intervals, bodies of the cable connectors are positioned in corresponding limiting slots.

6. The connector module according to claim 5, wherein the at least one limiting bracket comprises a first limiting bracket, a second limiting bracket, a third limiting bracket and a fourth limiting bracket; wherein the first limiting bracket is assembled and fixed to the first side wall, the second limiting bracket is assembled and fixed to the second side wall, the third limiting bracket is assembled and fixed to the third side wall, and the fourth limiting bracket is assembled and fixed to the fourth side wall; and wherein the limiting slots comprise a plurality of first limiting slots provided on the first limiting bracket, a plurality of second limiting slots provided on the second limiting bracket, a plurality of third limiting slots provided on the third limiting bracket, and a plurality of fourth limiting slots provided on the fourth limiting bracket.

7. The connector module according to claim 1, wherein the first bracket defines a first through hole, the second bracket defines a second through hole, the connector module further comprises a fastener passing through the first through hole and the second through hole, and the fastener is located on an outside of the circuit board.

8. The connector module according to claim 1, further comprising a conductive film assembled to the bracket; wherein the conductive terminals are pressed against the conductive film so that the conductive terminals are electrically connected to the conductive elements through the conductive film.

9. The connector module according to claim 1, wherein the conductive terminals comprise a first signal terminal and a second signal terminal; and the first signal terminal and the second signal terminal form a signal terminal pair;

the cable connector comprises a first ground terminal, a second ground terminal, a first shielding sheet and a second shielding sheet; the first ground terminal and the second ground terminal are located on opposite sides of the signal terminal pair, respectively, along a first direction; the first shielding sheet and the second shielding sheet are located on opposite sides of the signal terminal pair, respectively, along a second direction perpendicular to the first direction; the first shielding sheet comprises a first contact portion, a second contact portion, and a first protrusion located between the first contact portion and the second contact portion; the first protrusion protrudes in a direction away from the second shielding sheet;

the second shielding sheet comprises a third contact portion, a fourth contact portion, and a second protrusion located between the third contact portion and the fourth contact portion; the second protrusion protrudes in a direction away from the first shielding sheet;

the first contact portion and the third contact portion are in contact with two sides of the first ground terminal, respectively; the second contact portion and the fourth contact portion are in contact with two sides of the second ground terminal, respectively; the first contact portion, the first ground terminal, the third contact portion, the first protrusion, the second protrusion, the second contact portion, the second ground terminal and the fourth contact portion are jointly enclosed to form a shielding cavity; and the first signal terminal and the second signal terminal are located in the shielding cavity.

10. The connector module according to claim 9, wherein the body comprises a mounting surface and a mounting groove extending through the mounting surface; and wherein the first ground terminal, the second ground terminal, the first signal terminal, the second signal terminal, the first shielding sheet and the second shielding sheet are accommodated in the mounting groove.

11. The connector module according to claim 9, wherein the first signal terminal comprises a first mating surface, the second signal terminal comprises a second mating surface, the first ground terminal comprises a third mating surface, the second ground terminal comprises a fourth mating surface; the first mating surface, the second mating surface, the third mating surface and the fourth mating surface are located in a same plane; the first mating surface, the second mating surface, the third mating surface and the fourth mating surface are configured to be electrically connected to corresponding conductive elements, respectively.

12. The connector module according to claim 9, wherein the cable connector comprises a terminal module, the terminal module comprises the first signal terminal, the second signal terminal, and a first fixing block for fixing the first signal terminal and the second signal terminal; the first signal terminal comprises a first tail portion protruding beyond the first fixing block, and a first abutting portion protruding beyond the first fixing block and opposite to the first tail portion; the second signal terminal comprises a second tail portion protruding beyond the first fixing block, and a second abutting portion protruding beyond the first fixing block and opposite to the second tail portion;

the cable comprises a first core, a second core, a first insulating layer wrapped on at least part of the first core, a second insulating layer wrapped on at least part of the second core, a ground shielding layer wrapped on at least part of the first insulating layer and at least part of the second insulating layer, and an insulating skin wrapping at least part of the ground shielding layer;

wherein the first tail portion of the first signal terminal is in contact with the first core, the second tail portion of the second signal terminal is in contact with the second core, the first ground terminal is in contact with the ground shielding layer, and the second ground terminal is in contact with the ground shielding layer.

13. A connector module, comprising:

a bracket comprising a first bracket and a second bracket, the first bracket defining at least one receiving groove; the first bracket comprising an opening surrounded by a plurality of side walls; the second bracket being of a frame-shaped configuration, and the second bracket comprises a central opening extending through the second bracket along a vertical direction; and at least one cable connector, the cable connector comprising a body, a plurality of conductive terminals and a plurality of cables connected to the plurality of conductive terminals, the body being at least partially accommodated in the receiving groove, the plurality of conductive terminals being configured to engage with a plurality of conductive elements of a circuit board; the circuit board being at least partially clamped between the first bracket and the second bracket; the circuit board being configured to mount a chip which is exposed in the opening;

the connector module further comprises at least one pressing block, wherein the pressing block is assembled and fixed to the first bracket, and the pressing block is pressed against the body so as to maintain the body in the receiving groove.

14. The connector module according to claim 13, wherein the pressing block is detachably assembled to the first bracket, the pressing block defines a first mounting hole, and the side wall defines a second mounting hole aligned with the first mounting hole;

wherein the connector module further comprises a fastening member passing through the first mounting hole and the second mounting hole;

wherein the fastening member is a first bolt, the first bolt comprises a head and a threaded portion connected to the head, the threaded portion passes through the first mounting hole, and the threaded portion is at least partially fastened in the second mounting hole; and wherein the pressing block defines a notch in which the first mounting hole is located, and the head is received in the notch.

15. A connector module, comprising:

a bracket comprising a first bracket and a second bracket; the first bracket comprising a plurality of side walls and an opening surrounded by the plurality of side walls; the plurality of side walls comprising a first side wall, a second side wall opposite to the first side wall, a third side wall connecting one end of the first side wall and one end of the second side wall, and a fourth side wall connecting another end of the first side wall and another end of the second side wall; each of the first side wall, the second side wall, the third side wall and the fourth side wall being provided with a plurality of receiving grooves; the second bracket being of a frame-shaped configuration, and the second bracket comprising a central opening extending through the second bracket along a vertical direction and a plurality of heat dissipation channels extending along horizontal directions; and a plurality of cable connectors correspondingly accommodated in the receiving grooves; each cable connector comprising a body, a plurality of conductive terminals and a plurality of cables connected to the plurality of conductive terminals, each body being at least partially accommodated in a corresponding receiving groove, the plurality of conductive terminals being configured to engage with a plurality of conductive elements of a circuit board; the circuit board being at least partially clamped between the first bracket and the second bracket; the circuit board being configured to mount a chip which is exposed in the opening; the central opening corresponds to the chip along the vertical direction.

16. The connector module according to claim 15, wherein the first bracket defines a first through hole, the second bracket defines a second through hole, the connector module further comprises a fastener passing through the first through hole and the second through hole, and the fastener is located on an outside of the circuit board.

17. The connector module according to claim 15, further comprising a plurality of pressing blocks which are assembled and fixed to the first bracket, wherein each pressing block is pressed against a corresponding body so as to maintain the body in the corresponding receiving groove.

18. The connector module according to claim 17, wherein each pressing block is detachably assembled to the first bracket, the pressing block defines a first mounting hole, and the first bracket defines a second mounting hole aligned with the first mounting hole;

wherein the connector module further comprises a fastening member passing through the first mounting hole and the second mounting hole;

wherein the fastening member is a first bolt, the first bolt comprises a head and a threaded portion connected to the head, the threaded portion passes through the first mounting hole, and the threaded portion is at least partially fastened in the second mounting hole; and wherein the pressing block defines a notch in which the first mounting hole is located, and the head is received in the notch.

19. The connector module according to claim 15, wherein the conductive terminals comprise a first signal terminal and a second signal terminal; and the first signal terminal and the second signal terminal form a signal terminal pair;

the cable connector comprises a first ground terminal, a second ground terminal, a first shielding sheet and a second shielding sheet; the first ground terminal and the second ground terminal are located on opposite sides of the signal terminal pair, respectively, along a first direction; the first shielding sheet and the second shielding sheet are located on opposite sides of the signal terminal pair, respectively, along a second direction perpendicular to the first direction; the first shielding sheet comprises a first contact portion, a second contact portion, and a first protrusion located between the first contact portion and the second contact portion; the first protrusion protrudes in a direction away from the second shielding sheet;

the second shielding sheet comprises a third contact portion, a fourth contact portion, and a second protrusion located between the third contact portion and the fourth contact portion; the second protrusion protrudes in a direction away from the first shielding sheet;

the first contact portion and the third contact portion are in contact with two sides of the first ground terminal, respectively; the second contact portion and the fourth contact portion are in contact with two sides of the second ground terminal, respectively; the first contact portion, the first ground terminal, the third contact portion, the first protrusion, the second protrusion, the second contact portion, the second ground terminal and the fourth contact portion are jointly enclosed to form a shielding cavity; and the first signal terminal and the second signal terminal are located in the shielding cavity.

* * * * *